US012766550B2

(12) United States Patent
Hashizume et al.

(10) Patent No.: US 12,766,550 B2
(45) Date of Patent: Oct. 20, 2026

(54) SURFACE-TREATED GALVANIZED STEEL SHEET

(71) Applicant: JFE STEEL CORPORATION, Tokyo (JP)

(72) Inventors: Yukichika Hashizume, Tokyo (JP); Takeshi Matsuda, Tokyo (JP)

(73) Assignee: JFE STEEL CORPORATION, Chiyoda-ku (JP)

( * ) Notice: Subject to any disclaimer, the term of this patent is extended or adjusted under 35 U.S.C. 154(b) by 242 days.

(21) Appl. No.: 18/839,726

(22) PCT Filed: Oct. 12, 2022

(86) PCT No.: PCT/JP2022/038116

§ 371 (c)(1),
(2) Date: Aug. 20, 2024

(87) PCT Pub. No.: WO2023/176027

PCT Pub. Date: Sep. 21, 2023

(65) Prior Publication Data

US 2025/0161982 A1 May 22, 2025

(30) Foreign Application Priority Data

Mar. 17, 2022 (JP) ................................ 2022-043226

(51) Int. Cl.
*B05D 7/14* (2006.01)
*C23C 2/06* (2006.01)
*C23C 2/26* (2006.01)

(52) U.S. Cl.
CPC .................. *B05D 7/14* (2013.01); *C23C 2/26* (2013.01); *C23C 2/06* (2013.01)

(58) Field of Classification Search
None
See application file for complete search history.

(56) References Cited

U.S. PATENT DOCUMENTS 10,253,416 B2 4/2019 Kudo et al.
2005/0121114 A1* 6/2005 Fernandez Gonzalez .................. C23G 1/00 148/252

(Continued)

FOREIGN PATENT DOCUMENTS

JP 2015209585 A 11/2015
JP 2019026893 A 2/2019

(Continued)

OTHER PUBLICATIONS

Dietl—WO 2014-029654 A1—MT—anti-corrosion formulation—2014 (Year: 2014).*

(Continued)

*Primary Examiner* — John Vincent Lawler
(74) *Attorney, Agent, or Firm* — KENJA IP LAW PC

(57) ABSTRACT

Provided is a surface-treated galvanized steel sheet that has excellent delayed fracture resistance and that can be manufactured at low cost. The surface-treated galvanized steel sheet includes a steel sheet having a tensile strength of 1180 MPa or more, a galvanized layer, and a coating, where the coating contains an additive in an amount of 10 mass % or more and 50 mass % or less in terms of solid content. The additive is at least one selected from the group consisting of a salt of an aliphatic dicarboxylic acid having 2 to 8 carbon atoms and an alkylamine having 6 to 18 carbon atoms; a salt of an aliphatic dicarboxylic acid having 2 to 8 carbon atoms and a cycloalkylamine having 6 to 18 carbon atoms; and a salt of an aromatic monocarboxylic acid having 7 to 12 carbon atoms and an alkylamine having 6 to 18 carbon atoms.

8 Claims, 5 Drawing Sheets

(56) References Cited

U.S. PATENT DOCUMENTS

| | | | | |
|---|---|---|---|---|
| 2008/0233390 | A1* | 9/2008 | Gothlich | C23C 22/56 524/561 |
| 2015/0219549 | A1* | 8/2015 | Ootsuka | G01N 27/304 204/404 |
| 2016/0244884 | A1* | 8/2016 | Kudo | C23C 22/05 |
| 2020/0109464 | A1 | 4/2020 | Kim et al. | |

FOREIGN PATENT DOCUMENTS

| | | | | |
|---|---|---|---|---|
| JP | 2020521880 | A | 7/2020 | |
| WO | WO-2014029654 | A1 * | 2/2014 | C23C 22/02 |
| WO | 2014054186 | A1 | 4/2014 | |
| WO | 2021065485 | A1 | 4/2021 | |

OTHER PUBLICATIONS

Jan. 10, 2023, International Search Report issued in the International Patent Application No. PCT/JP2022/038116.

Yuki Toji et al., Evaluation of Hydrogen Embrittlement for High Strength Steel Sheets, Tetsu-to-Hagané, 2009, pp. 887-894, vol. 95, No. 12.

Apr. 14, 2025, the Extended European Search Report issued by the European Patent Office in the corresponding European Patent Application No. 22932290.4.

* cited by examiner

SURFACE-TREATED GALVANIZED STEEL SHEET

TECHNICAL FIELD

The present disclosure relates to a surface-treated galvanized steel sheet.

BACKGROUND

In recent years, there has been a demand in the automotive field to reduce $CO_2$ emissions by reducing automotive body weight from the viewpoint of environmental protection. In addition, from the viewpoint of protecting occupants, there is a need to improve crashworthiness of automobiles and increase strength of steel sheets for automobiles. However, it is known that the phenomenon of delayed fracture is more likely to occur in a steel material with increased strength. Delayed fracture is a phenomenon in which brittle fracture occurs suddenly without plastic deformation when high tensile strength steel is under static load stress (load stress below the tensile strength) for a certain period of time.

Delayed fracture is known to be caused by hydrogen entering the steel from the environment (hydrogen embrittlement). Hydrogen may enter the steel in a pickling process during the steel sheet manufacturing and processing, a wet coating or plating process, or by corrosion in atmospheric environments, or the like. TOJI et al., "Evaluation of Hydrogen Embrittlement for High Strength Steel Sheets", Tetsu-to-Hagane, Vol. 95, No. 12 (2009) 887 (NPL 1) reports that delayed fracture occurs in high strength steel sheets with a tensile strength of 1180 MPa or more.

To prevent delayed fracture in a high strength steel sheet, surface treatment of the steel sheet is being studied. For example, a technology that suppresses hydrogen generation on the surface of a galvanized high strength steel sheet by forming a chemical conversion treatment layer containing bismuth on the surface of the steel sheet (JP 2015-209585 A (PTL 1)) is known as a surface treatment technology to prevent hydrogen from entering a galvanized steel sheet in atmospheric corrosion environments. Further, a technology has been proposed (JP 2019-26893 A (PTL 2)) that suppresses hydrogen entry by forming a zinc-nickel based coating or plating layer on the surface of a high strength steel sheet where Ni is added in the coating or plating.

CITATION LIST

Patent Literature

PTL 1: JP 2015-209585 A
PTL 2: JP 2019-26893 A

Non-Patent Literature

NPL 1: TOJI et al., "Evaluation of Hydrogen Embrittlement for High Strength Steel Sheets", Tetsu-to-Hagane, Vol. 95, No. 12 (2009) 887

SUMMARY

Technical Problem

However, bismuth is very expensive, resulting in high manufacturing costs. In addition, although the technologies in all of the above patent literatures are effective at temperatures above room temperature, their effectiveness in low-temperature environments such as in cold climate areas is unknown.

It could thus be helpful to provide a surface-treated galvanized steel sheet that has excellent delayed fracture resistance even in a low-temperature environment regardless of the composition of a base steel sheet and that can be manufactured at low cost.

Solution to Problem

To solve the above problems, we have conducted intensive studies on suppressing hydrogen entry by surface treatment of steel sheets. As a result, we found that delayed fracture of a galvanized steel sheet can be effectively suppressed by forming a coating on the steel sheet, where the coating contains at least one additive component selected from the group consisting of a salt of an aliphatic dicarboxylic acid and an alkylamine, a salt of an aliphatic dicarboxylic acid and a cycloalkylamine, and a salt of an aromatic monocarboxylic acid and an alkylamine, in an amount of 10 mass % or more and 50 mass % or less in terms of solid content.

The present disclosure is based on the above findings. Specifically, primary features of the present disclosure are as follows.

[1] A surface-treated galvanized steel sheet, comprising
- a steel sheet having a tensile strength of 1180 MPa or more,
- a galvanized layer formed on at least one side of the steel sheet, and
- a coating formed on the galvanized layer, wherein
- the coating contains an additive in an amount of 10 mass % or more and 50 mass % or less in terms of solid content, and
- the additive is at least one selected from the group consisting of a salt of an aliphatic dicarboxylic acid having 2 to 8 carbon atoms and an alkylamine having 6 to 18 carbon atoms; a salt of an aliphatic dicarboxylic acid having 2 to 8 carbon atoms and a cycloalkylamine having 6 to 18 carbon atoms; and a salt of an aromatic monocarboxylic acid having 7 to 12 carbon atoms and an alkylamine having 6 to 18 carbon atoms.

[2] The surface-treated galvanized steel sheet according to aspect [1], wherein the aliphatic dicarboxylic acid having 2 to 8 carbon atoms is at least one selected from the group consisting of oxalic acid, maleic acid, fumaric acid, malonic acid, succinic acid, glutaric acid, and adipic acid,
- the aromatic monocarboxylic acid having 7 to 12 carbon atoms is at least one selected from the group consisting of benzoic acid, m-aminobenzoic acid, p-aminobenzoic acid, p-nitrobenzoic acid, salicylic acid, p-hydroxybenzoic acid, toluic acid, p-t-butylbenzoic acid, and β-oxynaphthoic acid,
- the alkylamine having 6 to 18 carbon atoms is at least one selected from the group consisting of octadecylamine, dodecylamine, decylamine, monooctylamine, monohexylamine, monodecanoic amine, monododecanoic amine, and mono-2-ethylhexylamine, and
- the cycloalkylamine having 6 to 18 carbon atoms is cyclohexylamine, dicyclohexylamine, or tricyclohexylamine.

[3] The surface-treated galvanized steel sheet according to aspect [1] or [2], wherein a hydrogen permeation current density $iH_t$ measured by adding the additive to a solution simulating a corrosion environment at 1 g/L, and a hydrogen permeation current density $iH_0$ measured without adding the additive to the solution satisfy the following Expression (1), $$iH_t/iH_0 \leq 0.50 \quad (1)$$

where the hydrogen permeation current density iH is measured by electrically connecting a zinc sheet and a test steel sheet, exposing the zinc sheet and one side of the test steel sheet to the solution, taking the one side as a hydrogen entry surface, taking the other side of the test steel sheet as a hydrogen detection surface comprising a palladium coating or plating, and measuring the hydrogen permeation current density using an electrochemical cell provided on the hydrogen detection surface.

[4] The surface-treated galvanized steel sheet according to any one of aspects [1] to [3], comprising a pre-treatment layer between the galvanized layer and the coating.

[5] The surface-treated galvanized steel sheet according to any one of aspects [1] to [4], wherein the coating contains at least one selected from the group consisting of epoxy resin, acrylic resin, urethane resin, ethylene resin, phenol resin, polyester resin, fluororesin, polyolefin resin, and epoxy ester resin.

Advantageous Effect

According to the present disclosure, it is possible to provide a surface-treated galvanized steel sheet that has excellent delayed fracture resistance even in a low-temperature environment regardless of the composition of a base steel sheet and that can be manufactured at low cost.

DETAILED DESCRIPTION

Figure 1A:
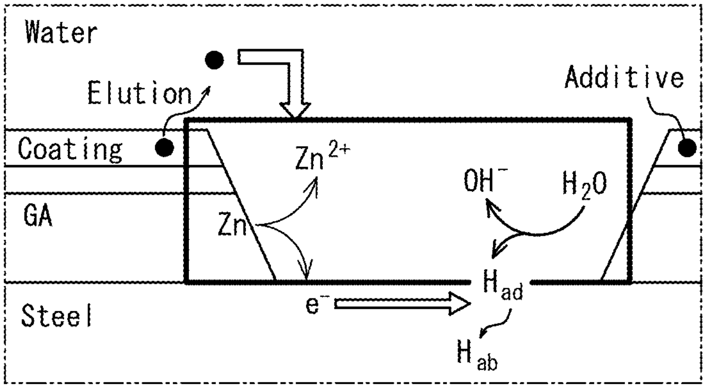
FIG. 1A is a diagram for explaining a hydrogen permeation current density measurement method.

The following describes embodiments of the surface-treated galvanized steel sheet of the present disclosure. Note that the present disclosure is not limited to the following embodiments. In the present specification, a numerical range expressed by using "to" means a range including numerical values described before and after "to", as the lower limit value and the upper limit value.

First, an overview of the surface-treated galvanized steel sheet of the present disclosure will be described. The surface-treated galvanized steel sheet of the present disclosure has a steel sheet with a tensile strength of 1180 MPa or more, a galvanized layer formed on at least one side of the steel sheet, and a coating formed on the galvanized layer. The following is a detailed description of the surface-treated galvanized steel sheet.

First, the steel sheet that serves as a base steel sheet of the surface-treated galvanized steel sheet will be described. The steel sheet is a high strength steel sheet with a tensile strength of 1180 MPa or more. The tensile strength of the steel sheet is preferably 1470 MPa or more. Delayed fracture is less likely to occur in steel sheets with a low tensile strength. The steel sheets with a low tensile strength also have the effect of excellent delayed fracture resistance even in low-temperature environments, but the effect is more pronounced in steel sheets with a tensile strength of 1180 MPa or more and even more pronounced in steel sheets with a tensile strength of 1470 MPa or more.

The tensile strength of the steel sheet is measured as follows. A JIS No. 5 tensile test piece is taken from the steel sheet with the direction orthogonal to the rolling direction being the longitudinal direction (tensile direction), and the tensile strength (TS) is measured by a tensile test in accordance with JIS Z2241 (1998). When evaluating the tensile strength of the steel sheet (base steel sheet) of the surface-treated galvanized steel sheet, it is acceptable to remove the galvanized layer and the coating from the surface-treated galvanized steel sheet to separate a single steel sheet and evaluate the tensile strength of this steel sheet, and it is also acceptable to take the tensile strength of the surface-treated galvanized steel sheet as the tensile strength of the steel sheet, as described later.

The steel sheet needs to have the tensile strength described above, and the chemical composition of the steel sheet is not particularly limited. For example, the chemical composition may contain C: 0.1 mass % to 0.4 mass %, Si: 0 mass % to 2.5 mass %, Mn: 1 mass % to 3.5 mass %, P: 0 mass % to 0.05 mass %, and S: 0 mass % to 0.005 mass %, with the balance being Fe and inevitable impurities. The chemical composition preferably contains C: 0.1 mass % to 0.4 mass %, Si: 0.01 mass % to 2.5 mass %, Mn: 1 mass % to 3.5 mass %, P: 0.0001 mass % to 0.05 mass %, and S: 0.0001 mass % to 0.005 mass %, with the balance being Fe and inevitable impurities. The chemical composition of the steel sheet may further contain, as optional elements, at least one selected from the group consisting of Cu: 1.0 mass % or less, Ti: 0.2 mass % or less, V: 0.5 mass % or less, sol. Al: 0.1 mass % or less, Cr: 1.0 mass % or less, Nb: 0.2 mass % or less, W: 0.5 mass % or less, Zr: 0.1 mass % or less and B: 0.005 mass % or less, N: 0.0005 mass % to 0.0100 mass %, Ni: 0.01 mass % to 2.00 mass %, Mo: 0.005 mass % to 2.000 mass %, Ca: 0.002 mass % to 0.0050 mass %, REM: 00002 mass % to 0.0050 mass %, Sb: 0.002 mass % to 0.200 mass %, and Sn: 0.002 mass % to 0.200 mass %. These optional elements are preferably added in a total amount of about 4 mass % or less. The lower limits of the optional elements are preferably about sol. Al and Cr: 0.01 mass %, Cu, Ti, V, Nb, W and Zr: 0.005 mass %, and B: 0.0001 mass %. To improve various properties such as mechanical properties, the steel sheet may have a chemical composition that allows solid solution strengthening by adding interstitial solute elements such as C and N and substitutional solute elements such as Si, Mn, P and Cr, for example. The steel sheet may have a chemical composition that allows strengthening by precipitation by carbides and nitrides of Ti, Nb, V, Al, and other elements. The chemical composition of the steel sheet may contain strengthening elements such as W, Zr, B, Cu, and rare earth elements.

The steel microstructure of the steel sheet is also not limited. Various microstructural or structural modifications can be applied to the steel sheet, alone or in combination. For example, microstructural or structural modifications such as toughening by recovery annealing at a temperature where recrystallization does not occur or partial recrystallization strengthening that leaves unrecrystallized areas without complete recrystallization, strengthening by transformation microstructure such as formation of single phase of bainite or martensite or formation of complex structure of ferrite and these transformation microstructures, grain refinement strengthening expressed by the Hall-Petch formula: $\sigma=\sigma_0+kd^{-1/2}$ (where $\sigma$: stress, $\sigma_0$: internal stress, and k: material constant) where the ferrite grain size is d, or strengthening by processing such as rolling, can be performed alone or in combination.

Examples of commercially available steel sheets include JFE-CA1180, JFE-CA1320, JFE-CA1470, JFE-CA1180SF, JFE-CA1180Y1, JFE-CA1180Y2 (all manufactured by JFE Steel Corporation), and SAFC1180D (manufactured by NIPPON STEEL CORPORATION). Both a cold-rolled steel sheet and a hot-rolled steel sheet can be used as a high strength steel sheet.

The thickness of the steel sheet is also not limited. In one example, the thickness of the steel sheet may be 0.8 mm or more and 5 mm or less. The thickness of the steel sheet is more preferably 1.2 mm or more. The thickness of the steel sheet is more preferably 2.0 mm or less.

The surface-treated galvanized steel sheet of the present disclosure has a galvanized layer on at least one side of the steel sheet. The galvanized layer may be formed by any coating or plating method, such as hot dip coating, electroplating, electroless plating, or vapor deposition plating, but a hot-dip galvanized layer, an electrogalvanized layer, or the like is industrially commonly used. The hot-dip galvanized steel sheet includes a galvannealed steel sheet that is obtained by performing alloying treatment after hot-dip galvanizing.

The surface-treated galvanized steel sheet of the present disclosure has a coating containing the additive described below on the galvanized layer of the galvanized steel sheet described above. This suppresses hydrogen entry in corrosion environments and provides excellent delayed fracture resistance. The additive contained in the coating is at least one selected from the group consisting of a salt of an aliphatic dicarboxylic acid having 2 to 8 carbon atoms and an alkylamine having 6 to 18 carbon atoms, a salt of an aliphatic dicarboxylic acid having 2 to 8 carbon atoms and a cycloalkylamine having 6 to 18 carbon atoms, and a salt of an aromatic monocarboxylic acid having 7 to 12 carbon atoms and an alkylamine having 6 to 18 carbon atoms.

Galvanized steel sheets are widely used for members that require corrosion resistance in atmospheric environments. This is because zinc has an excellent sacrificial protection effect. However, as a counter reaction to the sacrificial protection reaction, a hydrogen evolution reaction occurs on the steel substrate of the galvanized steel sheet. Hydrogen entry into the galvanized steel sheet is largely due to the hydrogen evolution reaction. Therefore, we came up with the idea of suppressing hydrogen entry by suppressing the increase in exposed parts of steel substrate where hydrogen is generated, thereby completing the present disclosure. The additive added to the coating in the present disclosure is classified as a coating adsorption-type rust preventive additive that exhibits rust resistance by being adsorbed onto a metal surface. Although it is known that the coating adsorption-type rust preventive additive exhibits rust resistance by protecting a steel sheet surface from corrosion environments, we newly discovered that, through our independent studies, it can significantly improve delay fracture resistance by preventing entry of hydrogen generated by sacrificial protection reaction. It is thought that an additive with an amide group is eluted from the coating and adsorbed to the metal surface to cover the exposed steel substrate, where hydrogen is generated, and suppress hydrogen generation, thereby suppressing hydrogen entry.

The alkylamine or cycloalkylamine contained in the additive is preferably a primary amine or a secondary amine because they easily form salts with carboxylates. The alkylamine having 6 to 18 carbon atoms is preferably at least one selected from the group consisting of octadecylamine, dodecylamine, decylamine, monooctylamine, monohexylamine, monodecanoic amine, monododecanoic amine, and mono-2-ethylhexylamine. The cycloalkylamine having 6 to 18 carbon atoms is preferably cyclohexylamine, dicyclohexylamine, or tricyclohexylamine. The above-mentioned alkylamines or cycloalkylamines may be used in combination.

The aliphatic dicarboxylic acid having 2 to 8 carbon atoms or the aromatic monocarboxylic acid having 7 to 12 carbon atoms contained in the additive affects the ease of forming salts with alkylamines or cycloalkylamines. If an aliphatic dicarboxylic acid having 2 to 8 carbon atoms or an aromatic monocarboxylic acid having 7 to 12 carbon atoms is used as the carboxylic acid, forming a salt with a carboxylic acid and an amine becomes easy, and the solubility of amine improves.

The aliphatic carboxylic acid may be an aliphatic dicarboxylic acid having 2 to 8 carbon atoms. In this case, the additive is a diamine salt obtained from one mole of aliphatic dicarboxylic acid and two moles of amine, or a monoamine salt obtained from one mole of aliphatic dicarboxylic acid and one mole of amine. When the aliphatic dicarboxylic acid has 2 to 8 carbon atoms, the acid strength is increased, rendering it easier to form an amine salt, and the amine is more likely to be free in the coating, improving the solubility of the amine. On the other hand, when the aliphatic dicarboxylic acid has 9 or more carbon atoms, it is difficult to form an amine salt (especially a diamine salt), and the pH of the component salt tends to decrease.

The number of carbon atoms of the aliphatic dicarboxylic acid, which is 2 to 8, includes the number of carbon atoms of the aliphatic group and the number of carbon atoms of the carboxylic acid. Therefore, the number of carbon atoms excluding dicarboxylic acid is 0 to 6. The number of carbon atoms of the aliphatic dicarboxylic acid is preferably 6 or less. The aliphatic group of the aliphatic dicarboxylic acid is preferably an alkylene group having 1 to 6 carbon atoms or an alkenyl group having 2 to 6 carbon atoms. The alkylene group is more preferably an alkylene group having 1 to 4 carbon atoms. The alkenyl group is more preferably an alkenyl group having 2 to 4 carbon atoms. The aliphatic dicarboxylic acid having 2 to 8 carbon atoms may be oxalic acid in which the carbon atoms of a carboxyl group are connected by a single bond. The aliphatic dicarboxylic acid having 2 to 8 carbon atoms is preferably at least one selected from the group consisting of oxalic acid, maleic acid, fumaric acid, malonic acid, succinic acid, glutaric acid, and adipic acid.

The aromatic carboxylic acid may be an aromatic monocarboxylic acid having 7 to 12 carbon atoms. In the case of a salt of an aromatic carboxylic acid having 7 to 12 carbon atoms and an amine, an amine salt is easily formed, and the amine is more likely to be free in the coating, which improves the solubility of the amine.

The number of carbon atoms of the aromatic monocarboxylic acid, which is 7 to 12, includes the number of carbon atoms of the aromatic group and the number of carbon atoms of the carboxylic acid. Therefore, the number of carbon atoms excluding monocarboxylic acid is 6 to 11. The aromatic ring contained in the aromatic monocarboxylic acid is preferably a benzene ring or a naphthalene ring because they are easy to manufacture. A substituent such as a methyl group, a hydroxyl group, an amino group, or a nitro group may be bonded to the aromatic ring. The aromatic monocarboxylic acid having 7 to 12 carbon atoms is preferably at least one selected from the group consisting of benzoic acid, m-aminobenzoic acid, p-aminobenzoic acid, p-nitrobenzoic acid, salicylic acid, p-hydroxybenzoic acid, toluic acid, p-t-butylbenzoic acid, and β-oxynaphthoic acid.

The additive preferably satisfies the following Expression (1), where $iH_t$ is the hydrogen permeation current density measured by adding the additive to a solution simulating a corrosion environment at 1 g/L, and $iH_0$ is the hydrogen permeation current density measured without adding the additive to the solution.

$$iH_t/iH_0 \leq 0.50 \quad (1)$$

Here, the hydrogen permeation current density iH is determined by electrically connecting a zinc sheet and a test steel sheet, exposing the zinc sheet and one side of the test steel sheet to the solution, taking this one side as a hydrogen entry surface, taking the other side of the test steel sheet as a hydrogen detection surface having a palladium coating or plating, and measuring the hydrogen permeation current density using an electrochemical cell provided on the hydrogen detection surface.

The surface-treated galvanized steel sheet of the present disclosure has a coating containing the above-described additive, thereby suppressing hydrogen entry in corrosion environments and obtaining excellent delayed fracture resistance. By using an additive satisfying the above Expression (1), the delayed fracture resistance can be further improved.

The combination of carboxylic acid and amine to obtain an additive satisfying the above Expression (1) is not necessarily clear. However, it is thought that the adsorption capacity itself, which is the ability for the obtained additive to adsorb onto the steel sheet surface, changes depending on the number of carbon atoms, molecular weight, presence or absence of side chains, and the like of the carboxylic acid and amine used as raw materials for obtaining the additive. It is also believed that differences in the bulk of the obtained additives will result in differences in the shielding effect of the exposed steel substrate and differences in the hydrogen entry suppression effect.

Figure 1B:
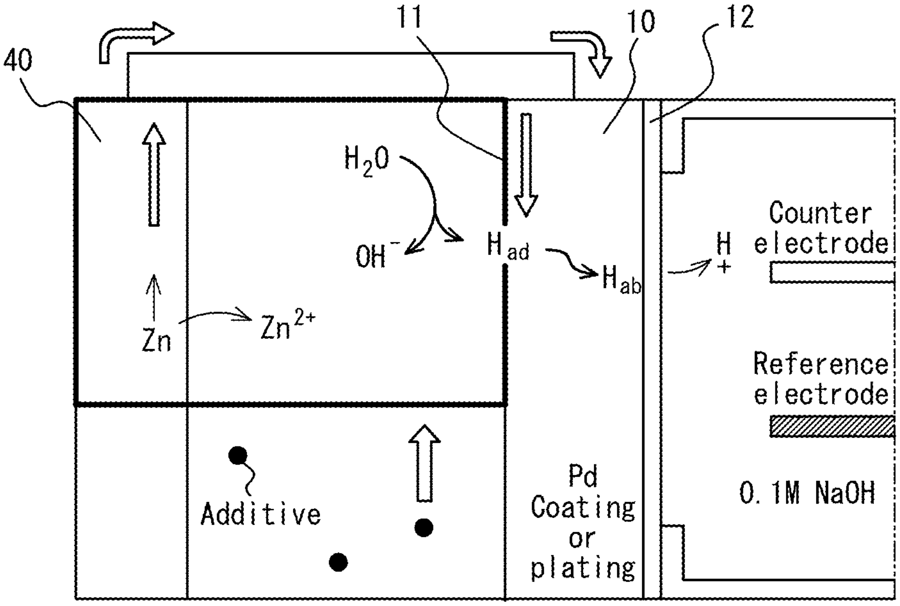
FIG. 1B is a diagram for explaining a hydrogen permeation current density measurement method.

FIGS. 1A and 1B provide an overview of a hydrogen permeation current density measurement method. As illustrated in FIG. 1A, in a sacrificial protection reaction, the galvanized layer is preferentially corroded instead of the steel sheet surface. At this time, electrons generated by the corrosion of the galvanized layer react with water to produce hydrogen, and the hydrogen enters the steel. It is thought that the additive in the coating is eluted from the coating and covers the exposed steel sheet surface, thereby preventing hydrogen entry. To quantitatively evaluate the effect of the additive, a model experiment is constructed to verify the effect of the additive contained in the coating on the sacrificial protection reaction (galvanic corrosion) of the galvanized layer when the steel substrate is exposed, as illustrated in FIG. 1B, and the hydrogen permeation current density is measured. As illustrated in FIG. 1B, a test steel sheet 10 is sandwiched between two reaction tanks (hydrogen generation tank 20 and hydrogen detection tank 21), and with the test steel sheet 10 in conduction with a zinc sheet 40, the zinc sheet 40 and one side 11 (hydrogen entry surface) of the test steel sheet 10 are exposed to a solution simulating a corrosion environment in the hydrogen generation tank 20. The chemical composition of the zinc sheet 40 contains zinc and inevitable impurities. Then, a sacrificial protection reaction of the zinc sheet 40 occurs in the hydrogen generation tank 20, electrons flow to the conductive test steel sheet 10, and a hydrogen evolution reaction occurs on the one side 11 of the test steel sheet 10. This allows hydrogen to enter the steel from the one side 11 of the test steel sheet 10, and the hydrogen diffuses and moves in the steel toward the other side 12 of the test steel sheet 10. When a potential capable of oxidizing hydrogen into hydrogen ions is applied to the other side 12 (hydrogen detection surface) of the test steel sheet 10 facing the hydrogen detection tank 21, hydrogen that has diffused and moved and reached the hydrogen detection surface 12 is oxidized into hydrogen ions. Then, the hydrogen entry behavior can be quantified by measuring the oxidation current (hydrogen permeation current) at the hydrogen detection surface 12. At this time, by adding an additive to the solution in the hydrogen generation tank 20 that causes the sacrificial protection reaction, it is possible to investigate the effect of the additive on the hydrogen entry behavior into the test steel sheet 10.

Figure 2:
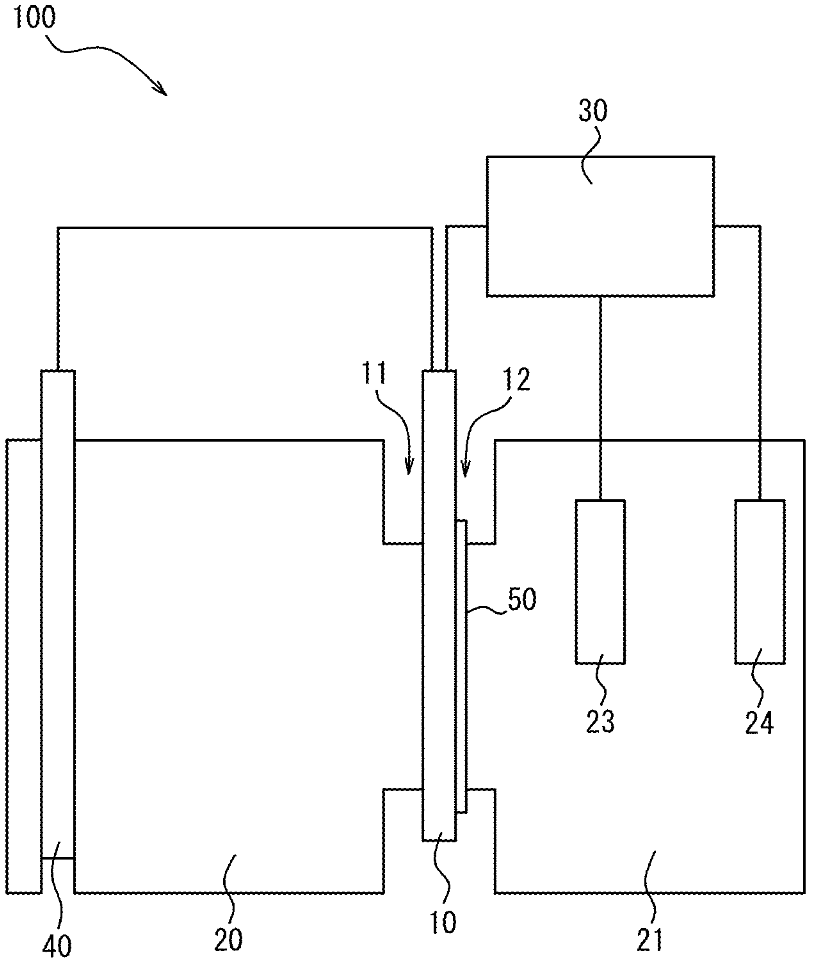
FIG. 2 schematically illustrates a hydrogen entry amount measurement device.

FIG. 2 schematically illustrates a hydrogen entry amount measurement device 100 that is used to measure the hydrogen permeation current density. One side 11 of the test steel sheet 10 is exposed to a solution simulating a corrosion environment in the hydrogen generation tank 20 and is taken as the hydrogen entry surface 11, and the other side of the test steel sheet 10 is taken as the hydrogen detection surface 12. The hydrogen detection surface 12 has a palladium coating or plating 50 to prevent reactions other than a hydrogen oxidation reaction as much as possible. An electrochemical cell for measuring anodic current is also provided on the hydrogen detection surface 12. Any electrochemical cell that can measure anodic current at the hydrogen detection surface 12 can be used as the electrochemical cell. In the example illustrated in FIGS. 1A and 1B, the electrochemical cell is the hydrogen detection tank 21 that has an electrolyte, a container for the electrolyte, and a reference electrode 23 and a counter electrode 24 installed inside the container.

To reduce the influence of specific test conditions when measuring the hydrogen permeation current density, the present disclosure evaluates the effect of the additive on the hydrogen entry behavior into the steel sheet by a ratio $iH_t/iH_0$ rather than the specific value of hydrogen permeation current density iH, where $iH_t$ is the hydrogen permeation current density measured by adding the additive to the solution in the hydrogen generation tank 20 at 1 g/L, and $iH_0$ is the hydrogen permeation current density measured without adding the additive to the solution in the hydrogen generation tank 20. Specifically, the additive contained in the coating is preferably an additive where $iH_t/iH_0$ satisfies the following Expression (1).

$$iH_t/iH_0 \leq 0.50 \quad (1)$$

In other words, if the hydrogen permeation current density $iH_t$ measured with the additive added to the solution is half or less of the hydrogen permeation current density $iH_0$ measured without adding the additive in the solution under the same conditions, the additive can be evaluated as an additive that can suitably reduce hydrogen entry into the steel. The $iH_t/iH_0$ of the additive is more preferably 0.40 or less and even more preferably 0.30 or less. The $iH_t/iH_0$ is preferably low, and the lower limit is not particularly limited. It may be 0.01 or more in one example.

The following describes more detailed experimental conditions for the hydrogen permeation current density measurement method. The hydrogen generation tank 20 is assembled so that the zinc sheet 40 and the test steel sheet 10 face each other with the hydrogen generation tank 20 in between. The temperature of the hydrogen generation tank 20 and the hydrogen detection tank 21 is adjusted to 10° C. using a temperature control device such as a water bath. The thickness of the test steel sheet 10 is 0.5 mm. The hydrogen detection surface 12 of the test steel sheet 10 in contact with the hydrogen detection tank 21 is coated or plated with about 100 nm palladium to prevent reactions other than a hydrogen oxidation reaction as much as possible. The hydrogen detection tank 21 is filled with 0.1M NaOH aqueous solution that has been subjected to nitrogen degassing as an electrolyte. A potentiostat 30 is connected to the test steel sheet 10 and the reference electrode 23 and the counter electrode 24 attached to the hydrogen detection tank 21, and anode polarization is started at a constant potential of 0 to 0.2 V vs SHE. After the anodic current decreases to 0.1 $\mu A/cm^2$ or less, the hydrogen generation tank 20 is filled with a 5 wt % NaCl aqueous solution as a corrosive solution. The additive is contained in the NaCl aqueous solution at a concentration of 1 g/L. The zinc sheet 40 and the test steel sheet 10 are connected with a copper wire or the like to establish electrical continuity, and a sacrificial protection reaction is started. After the sacrificial protection reaction starts and the current becomes sufficiently stable, that is, after 48 hours have passed from the start of the sacrificial protection reaction, the hydrogen permeation current densities $iH_t$ and $iH_0$ are evaluated.

Figure 3:
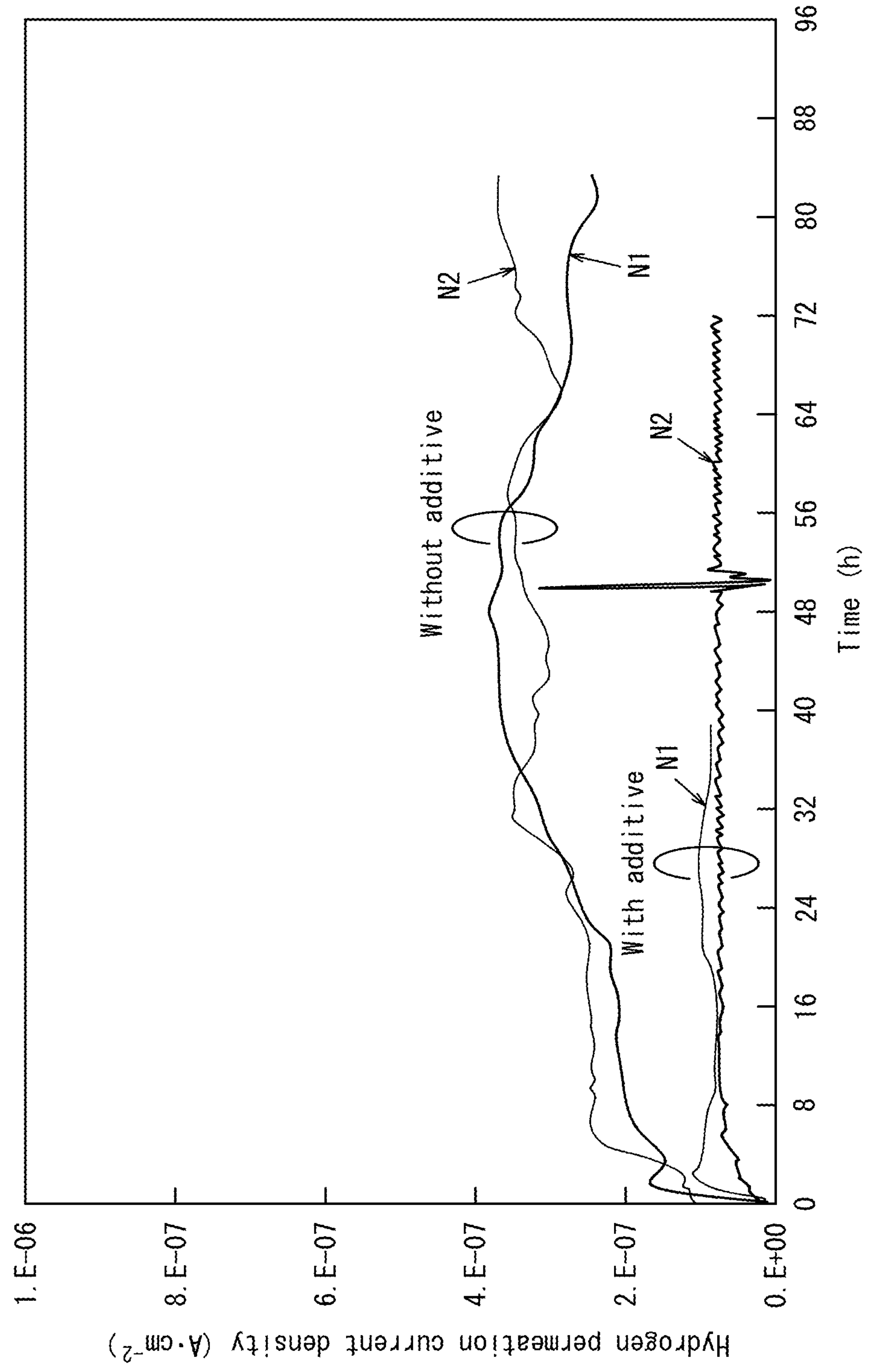
FIG. 3 illustrates an example of hydrogen permeation current density measurement results.

FIG. 3 illustrates an example of the hydrogen permeation current density measurement results. In the example in FIG. 3, a diamine salt of fumaric acid and monooctylamine is used as the additive. The hydrogen permeation current density $iH_0$ when the additive was not contained in the solution in the hydrogen generation tank 20 and the hydrogen permeation current density $iH_t$ when the additive was contained in the solution in the hydrogen generation tank 20 were each measured twice under the same conditions, and the average value was obtained. In FIG. 3, the results of the first measurement are indicated as N1, and the results of the second measurement are indicated as N2. The hydrogen permeation current density $iH_0$ was 0.35 $\mu A/cm^2$ when the additive was not contained in the solution in the hydrogen generation tank 20, and the hydrogen permeation current density $iH_t$ was 0.07 $\mu A/cm^2$ when the additive was contained in the solution in the hydrogen generation tank 20.

Table 1 lists the $iH_t/iH_0$ of various additives. Examples of additives that satisfy Expression (1) include X1 to 60, 62 to 68, 70 to 76, 78 to 84, 86 to 92, 94 to 100, 102 to 108, 110 to 116, 118 to 124, and 126 to 149 in Table 1.

The coating contains the above-described additive in an amount of 10 mass % or more and 50 mass % or less in terms of solid content. In order for the coating to sufficiently exhibit delayed fracture resistance in corrosion environments, the content of the additive in the coating (as a ratio to the mass of the coating) is set to 10 mass % or more. As the content of the additive in the coating increases, the area where the component alkylamine or cycloalkylamine with an amide group is adsorbed onto the steel sheet surface also increases, which is thought to improve the delayed fracture resistance. On the other hand, if the content exceeds 50 mass %, the strength of the coating itself may decrease. Therefore, the content of the additive is set to 50 mass % or less. The coating preferably contains 15 mass % or more and more preferably 20 mass % or more of the additive in terms of solid content. Further, the coating preferably contains 40 mass % or less and more preferably 30 mass % or less of the additive in terms of solid content. When the coating consists of multiple layers, the total content of the additive contained in the multiple layers is set to 10 mass % or more and 50 mass % or less in terms of solid content.

Next, components contained in the coating other than the above-described additive will be described. The coating may contain an organic resin. The organic resin is preferably at least one selected from the group consisting of epoxy resin, acrylic resin, urethane resin, ethylene resin, phenol resin, polyester resin, fluororesin, polyolefin resin, and epoxy ester resin. This is because these organic resins act as a barrier layer that protects the steel sheet from corrosion factors to suppress corrosion due to hydrogen evolution reaction and prevent the galvanized layer from peeling off during processing. The above organic resins can be used in combination of two or more. It is also possible to form a coating consisting of multiple layers using two or more types of resins among the above organic resins.

From the viewpoint of improving corrosion resistance, the coating preferably consists of two or more layers. In one example, the coating consists of two layers: a lower coating provided on the galvanized steel sheet and an upper coating provided on the lower coating. Both the upper and lower coatings may contain the additive, or only one of them may contain the additive. From the viewpoint of achieving both corrosion resistance and weldability, the lower coating is preferably a coating that has excellent conductivity without deteriorating corrosion resistance.

Specifically, the lower coating is preferably obtained by applying and drying a surface-treatment solution (A) on the surface of the galvanized steel sheet, where the surface-treatment solution (A) contains a water-soluble zirconium compound (a), a tetraalkoxysilane (b), a compound having an epoxy group (c), a chelating agent (d), a vanadate compound (e), and a metal compound containing at least one selected from the group consisting of Ti, Al and Zn (f) in ranges that satisfy the following conditions (I) to (IV), and the surface-treatment solution (A) has a pH of 8 to 10.

(I) Mass Ratio (azr/b) of Zr-Equivalent Mass (azr) of Water-Soluble Zirconium Compound (a) to Tetraalkoxysilane (b): 1.0 to 6.0

When the mass ratio azr/b is 1.0 or more, a surface-treated galvanized steel sheet with better corrosion resistance can be obtained. When the mass ratio azr/b is 6.0 or less, the conductivity of the surface-treated galvanized steel sheet is improved.

(II) Mass Ratio (b/cs) of Tetraalkoxysilane (b) to Solid Content (cs) of Compound Having an Epoxy Group (c): 0.1 to 1.6

When the mass ratio b/cs is 0.1 or more, a surface-treated galvanized steel sheet with better corrosion resistance can be obtained. When the mass ratio b/cs is 1.6 or less, the adhesion of the coating is improved.

(III) Mass Ratio (b/ds) of Tetraalkoxysilane (b) to Solid Content (ds) of Chelating Agent (d): 0.3 to 2.0

When the mass ratio b/ds is 0.3 or more and 2.0 or less, a surface-treated galvanized steel sheet with better corrosion resistance can be obtained.

(IV) Mass Ratio (ev/ds) of V-Equivalent Mass (ev) of Vanadate Compound (e) to Solid Content (ds) of Chelating Agent (d): 0.03 to 1.0

When the mass ratio ev/ds is 0.03 or more, a surface-treated galvanized steel sheet with better corrosion resistance can be obtained. When the mass ratio ev/ds is 1.0 or less, it is easier to dissolve the vanadate compound (e) in the surface-treatment solution (A).

The thickness of the coating is not particularly limited. The thickness of the coating is preferably 0.3 μm or more in order to obtain better function as a barrier layer against corrosion environments. On the other hand, in the case of steel sheets for automobiles, there is a process in which the steel sheets are assembled together by spot welding after being processed into a predetermined shape by press working. At this time, if the coating is too thick, the current may not flow during welding, resulting in poor welding. Therefore, in applications where spot welding is used to join steel sheets, the thickness of the coating is preferably 4.0 μm or less. For a coating consisting of multiple layers, the total thickness of the multiple layers is taken as the thickness of the coating.

Regarding the thickness of the coating, a cross section of the coating is observed and the thickness of the coating (the thickness from the surface of the galvanized steel sheet to the surface of the coating) is measured at multiple locations (three locations) in an arbitrary field of view, and the average value of the results is taken as the thickness of the coating. The cross-sectioning method is not particularly limited, and examples thereof include focused ion beam (FIB) processing.

Next, a method of manufacturing the surface-treated galvanized steel sheet of the present disclosure will be described. The surface-treatment solution containing the additive is applied to at least one side of the above-described galvanized steel sheet, which is a base material, and dried to form a coating. The surface-treatment solution contains the above-described additive and organic resin.

A method of applying the surface-treatment solution to the surface of the galvanized steel sheet is not particularly limited, and can be any of a coating method (bar coating), a spray method, and an immersing method (and roller squeezing). The heating and drying method after applying the surface-treatment solution is not particularly limited, and an induction heater or the like can be used. The heating temperature is preferably equal to or lower than the decomposition temperature of the additive component. Specifically, the heating temperature after applying the surface-treatment solution is preferably 180° C. or lower, more preferably 160° C. or lower, and even more preferably 140° C. or lower. In the case of a layer consisting of two or more layers, it is preferable to apply the surface-treatment solution and heat and dry the solution in the manner described above for each layer.

The surface-treated galvanized steel sheet obtains excellent delayed fracture resistance that effectively suppresses delayed fracture due to the formation of a coating containing specific components on its surface, and this excellent delayed fracture resistance can be obtained regardless of the composition of the base steel sheet and even in low-temperature environments. Further, the surface-treated galvanized steel sheet can be manufactured at low cost because it does not use expensive materials such as bismuth for the surface coating. Therefore, it is suitable for automobiles and building materials, and its use in these applications can reduce the weight.

The following is supplement regarding the evaluation of tensile strength of the steel sheet (base steel sheet) of the surface-treated galvanized steel sheet. When evaluating the tensile strength of the steel sheet (base steel sheet) of the surface-treated galvanized steel sheet, it is acceptable to remove the galvanized layer and the coating from the surface-treated galvanized steel sheet to separate a single steel sheet and evaluate the tensile strength of this steel sheet, as described above. The coating and galvanized layer can be removed, for example, by immersing the surface-treated galvanized steel sheet in 10 mass % hydrochloric acid at 30° C. for 60 seconds. The method for removing the galvanized layer and the coating may be a method other than the above as long as it does not affect the tensile strength of the steel sheet. Normally, the tensile strength of the steel sheet, the tensile strength of the galvanized steel sheet, and the tensile strength of the surface-treated galvanized steel sheet are the same. In the present embodiment, the value of the tensile strength of the steel sheet may be replaced by the tensile strength of the galvanized steel sheet or the tensile strength of the surface-treated galvanized steel sheet. That is, the surface-treated galvanized steel sheet of the present disclosure has a tensile strength of 1180 MPa or more.

EXAMPLES

Example 1

A galvannealed steel sheet was used as the galvanized steel sheet, where the galvannealed steel sheet had a base steel sheet having a chemical composition containing C: 0.22 mass %, Si: 1.2 mass %, Mn: 3.0 mass %, P: 0.007 mass %, and S: 0.0005 mass %, with the balance being Fe and inevitable impurities, a tensile strength of 1580 MPa, a thickness of 1.4 mm, and a galvannealed layer on both the front and back sides of the steel sheet. The galvannealed steel sheet had a coating weight of 44 $g/m^2$ per side, and the Fe content in the alloyed galvanized layer was 14 mass %. The galvannealed steel sheet was immersed in toluene and ultrasonically cleaned for 5 minutes to remove rust-preventive oil, and then it was used as a sample steel sheet.

Each carboxylic acid and amine were added to 1 kg of deionized water in the molar ratio listed in Table 1, and they were heated to 80° C. and dissolved to obtain a solution. Next, the solution was cooled to 20° C. to precipitate additive crystals.

The hydrogen permeation current density of each additive was measured with the method described above. The evaluation results are listed in Table 1-1 to Table 1-3.

Preparation of Surface-Treated Galvanized Steel Sheet

The obtained additive crystals were filtered and dried, and then mixed with an organic resin in the mass ratio listed in Table 2 to obtain a surface-treatment solution. The following A1 to A4 were used as the organic resins, and a surface-treatment solution containing any of the organic resins and the prescribed additive (in some comparative examples, a surface-treatment solution containing only the organic resin) was applied to the surface of the sample steel sheet. The method of applying the surface-treatment solution was as listed in Table 2. Next, a coating was formed on the sample steel sheet by heating the sample steel sheet with an induction heater so that the sheet temperature reached 140° C., and a surface-treated galvanized steel sheet was obtained.

A1: Epoxy resin (manufactured by Japan Epoxy Resin Co., Ltd., product name: jER1009)

A2: Acrylic resin (manufactured by DIC Corporation, product name: 40-418EF)

A3: Urethane resin (manufactured by Dai Nippon Toryo Company, Limited, product name: V Top RC Clear)

A4: Fluororesin (manufactured by AGC Inc., product name: LUMIFLON LF552)

The following properties were evaluated for each surface-treated galvanized steel sheet obtained as described above. The evaluation results are listed in Table 2. The thickness of the coating was measured with the method described above.

(1) Evaluation of Delayed Fracture Resistance (Low Temperature)

Figure 4:
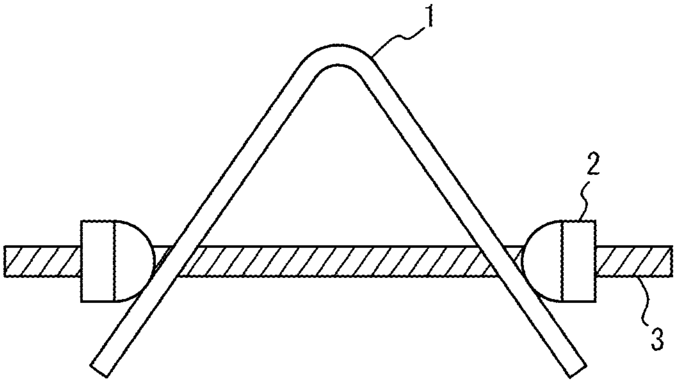
FIG. 4 is a diagram for explaining a test piece for delayed fracture resistance evaluation.
Figure 5:
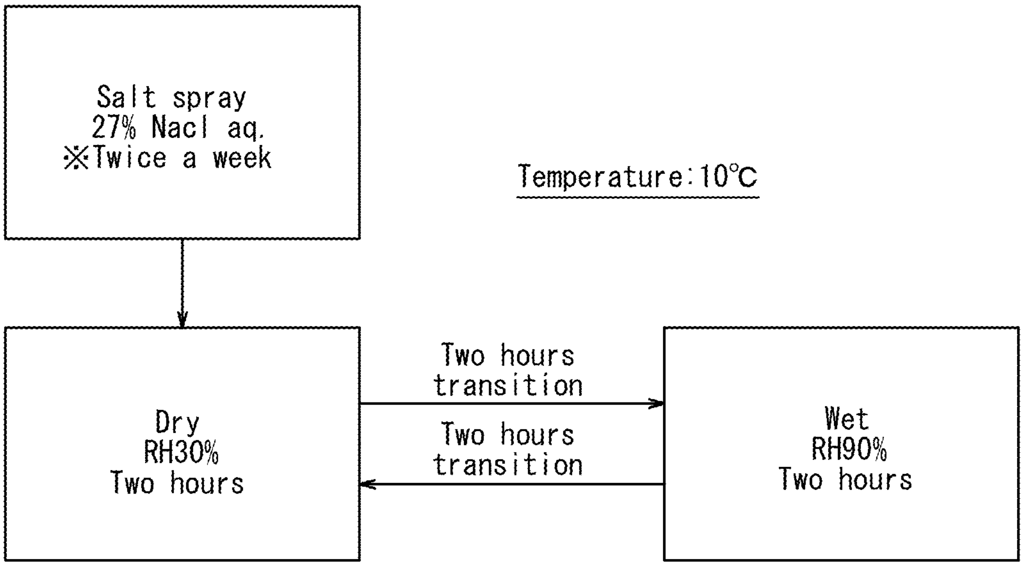
FIG. 5 is a diagram for explaining a dry-wet cycle test for delayed fracture resistance evaluation.

Galvanized steel sheets of Examples and Comparative Examples were each sheared to a size of 32 mm wide×110 mm long and then ground to a width of 30 mm to remove residual stress of shearing to obtain test pieces. Each test piece was bent at 90 degrees using a 3-point bending tester so that the bending radius was 10 mm. As illustrated in FIG. 4, the shape of the test piece 1 was fixed so that the inner distance between the flange ends after restricting the test piece using bolts 2 and a nut 3 (after fixing the test piece shape by tightening bolts 2 and a nut 3) was 13.8 mm narrower than the inner distance between the flange ends before restricting, thereby obtaining a test piece for delayed fracture resistance evaluation. The test piece for delayed fracture resistance evaluation thus prepared was subjected to a dry-wet cycle test simulating corrosion in a low-temperature environment, as illustrated in FIG. 5, for a maximum of 28 days. In this cycle, the test temperature was kept constant (10° C.), and one humidity cycle consisted of a total of four steps: a dry step with a relative humidity of 30%, a wet step with a relative humidity of 90%, a humidity increasing step, and a humidity decreasing step. The test was conducted by switching each step every 2 hours and repeating the cycle of 8 hours. Further, chloride was applied to the test piece for delayed fracture resistance evaluation by washing the test piece with pure water and then spraying a 27 wt % salt water (amount of attached salt: 10000 mg/m$^2$ per side) onto the test piece twice a week at the start of the dry step. Here, twice a week means that the second treatment is performed with an interval of 3 or 4 days after the first treatment. For example, if the first treatment is performed on Monday, then the second treatment is performed on Thursday and Friday. This is repeated thereafter.

At the start of drying process every three cycles (every day), the presence or absence of crack at the bent part of the test piece for delayed fracture resistance evaluation was visually checked, and the number of days until cracking occurred (hereinafter referred to as "cracking day") was investigated. In this test, three test pieces of each galvanized steel sheet of Examples and Comparative Examples were tested, and the average value of the cracking day was used to evaluate the delayed fracture resistance according to the following criteria. In the table, the cracking day being 29 means that no cracking occurred in this example. In the following description, the symbols ◎, ○, Δ and x mean good to poor in the stated order.

◎: Cracking day being 29 or more

○: Cracking day being 20 or more but less than 29

Δ: Cracking day being 10 or more but less than 20 x: Cracking day being less than 10

(2) Evaluation of Post-Coating Corrosion Resistance

The galvanized steel sheets of Examples and Comparative Examples were each sheared to a size of 150 mm×70 mm to obtain a flat test piece, which was used as a test piece for corrosion resistance evaluation. The test piece for corrosion resistance evaluation was subjected to chemical conversion treatment by immersion under standard conditions (35° C., 120 seconds) using "PALBOND" manufactured by Nihon Parkerizing Co., Ltd to obtain a chemical conversion treated test piece. Next, the chemical conversion treated test piece was subjected to electrodeposition coating and baking treatment using electrodeposition paint "GT-100" manufactured by Kansai Paint Co., Ltd. to obtain a post-coating test piece. The coating thickness of the electrodeposition coating was 15 μm, and the coating thickness was measured using a commercially available electromagnetic thickness tester. Then, an X-shaped cut (cross angle: 60° to 90°) was made on the post-coating test piece using a cutter so that the cut reached the coating of the surface-treated galvanized steel sheet, and a salt spray test specified in JIS Z2371 was performed for 840 hours. The maximum rust width from the cut of the post-coating test piece after the test was measured to evaluate the corrosion resistance. The corrosion resistance was evaluated as follows by calculating the maximum rust width A of each test piece, with the maximum rust width of a galvanized steel sheet without coating being 1.

◎: $A \le 0.8$

○: $0.8 < A \le 0.95$

Δ: $0.95 < A \le 1.2$

×: $1.2 < A$

In Table 2, No. 1 (Comparative Example) is a coated or plated steel sheet without coating (a comparative example that is a galvanized steel sheet as it is). It is understood that cracking occurs early in No. 1, indicating poor delayed fracture resistance.

The steel sheets of No. 3 to No. 161 are examples where a surface-treatment solution mixed with the additive and epoxy resin (A1) is applied to the surface of a galvannealed steel sheet with a coating method (bar coating) to form a coating. The steel sheet of No. 2 is an example where a surface-treatment solution containing epoxy resin (A1) but no additive is applied in the same manner to form a coating. Among these examples, the steel sheets of Nos. 4 to 164, where the additive content is in the range of the present disclosure, all have excellent delayed fracture resistance and good post-coating corrosion resistance.

On the other hand, the steel sheet of No. 2, where no additive is added, and the steel sheet of No. 3, where the additive content is less than the range of the present disclosure, have slightly improved delayed fracture resistance compared to the steel sheet of No. 1 without coating, but they have poor delayed fracture resistance compared to the steel sheets of Nos. 4 to 163 that are Examples. The steel sheets of No. 162 and No. 163 are Examples where the method of forming the coating is changed from that of the steel sheet of No. 5, and they all have excellent delayed fracture resistance and good post-coating corrosion resistance.

The steel sheets of No. 164 to No. 167 are Examples where the type of organic resin is changed, but they all have excellent delayed fracture resistance and good post-coating corrosion resistance.

TABLE 1-1

| | Carboxylic acid | | Amine | | | |
|---|---|---|---|---|---|---|
| Additive ID | Name | Molar ratio | Name | Molar ratio | $iH_t$ μA/cm$^2$ | $iH_t/iH_0$ — |
| X1 | Oxalic acid | 1 | Octadecylamine | 2 | 0.05 | 0.14 |
| X2 | Oxalic acid | 1 | Dodecylamine | 2 | 0.05 | 0.14 |
| X3 | Oxalic acid | 1 | Decylamine | 2 | 0.05 | 0.14 |
| X4 | Oxalic acid | 1 | Monooctylamine | 2 | 0.07 | 0.20 |
| X5 | Oxalic acid | 1 | Monohexylamine | 2 | 0.09 | 0.26 |
| X6 | Oxalic acid | 1 | Monodecanoic amine | 2 | 0.05 | 0.14 |
| X7 | Oxalic acid | 1 | Monododecanoic amine | 2 | 0.05 | 0.14 |
| X8 | Oxalic acid | 1 | Mono-2-ethylhexylamine | 2 | 0.07 | 0.20 |
| X9 | Maleic acid | 1 | Octadecylamine | 2 | 0.05 | 0.14 |
| X10 | Maleic acid | 1 | Dodecylamine | 2 | 0.05 | 0.14 |
| X11 | Maleic acid | 1 | Decylamine | 2 | 0.05 | 0.14 |
| X12 | Maleic acid | 1 | Monooctylamine | 2 | 0.07 | 0.20 |
| X13 | Maleic acid | 1 | Monohexylamine | 2 | 0.09 | 0.26 |
| X14 | Maleic acid | 1 | Monodecanoic amine | 2 | 0.05 | 0.14 |
| X15 | Maleic acid | 1 | Monododecanoic amine | 2 | 0.05 | 0.14 |
| X16 | Maleic acid | 1 | Mono-2-ethylhexylamine | 2 | 0.07 | 0.20 |
| X17 | Fumaric acid | 1 | Octadecylamine | 2 | 0.05 | 0.14 |
| X18 | Fumaric acid | 1 | Dodecylamine | 2 | 0.05 | 0.14 |
| X19 | Fumaric acid | 1 | Decylamine | 2 | 0.05 | 0.14 |
| X20 | Fumaric acid | 1 | Monooctylamine | 2 | 0.07 | 0.20 |
| X21 | Fumaric acid | 1 | Monohexylamine | 2 | 0.09 | 0.26 |
| X22 | Fumaric acid | 1 | Monodecanoic amine | 2 | 0.05 | 0.14 |
| X23 | Fumaric acid | 1 | Monododecanoic amine | 2 | 0.05 | 0.14 |
| X24 | Fumaric acid | 1 | Mono-2-ethylhexylamine | 2 | 0.07 | 0.20 |
| X25 | Malonic acid | 1 | Octadecylamine | 2 | 0.05 | 0.14 |
| X26 | Malonic acid | 1 | Dodecylamine | 2 | 0.05 | 0.14 |
| X27 | Malonic acid | 1 | Decylamine | 2 | 0.05 | 0.14 |
| X28 | Malonic acid | 1 | Monooctylamine | 2 | 0.07 | 0.20 |
| X29 | Malonic acid | 1 | Monohexylamine | 2 | 0.09 | 0.26 |
| X30 | Malonic acid | 1 | Monodecanoic amine | 2 | 0.05 | 0.14 |
| X31 | Malonic acid | 1 | Monododecanoic amine | 2 | 0.05 | 0.14 |
| X32 | Malonic acid | 1 | Mono-2-ethylhexylamine | 2 | 0.07 | 0.20 |
| X33 | Succinic acid | 1 | Octadecylamine | 2 | 0.05 | 0.14 |
| X34 | Succinic acid | 1 | Dodecylamine | 2 | 0.05 | 0.14 |
| X35 | Succinic acid | 1 | Decylamine | 2 | 0.05 | 0.14 |
| X36 | Succinic acid | 1 | Monooctylamine | 2 | 0.07 | 0.20 |
| X37 | Succinic acid | 1 | Monohexylamine | 2 | 0.09 | 0.26 |
| X38 | Succinic acid | 1 | Monodecanoic amine | 2 | 0.05 | 0.14 |
| X39 | Succinic acid | 1 | Monododecanoic amine | 2 | 0.05 | 0.14 |
| X40 | Succinic acid | 1 | Mono-2-ethylhexylamine | 2 | 0.07 | 0.20 |
| X41 | Glutaric acid | 1 | Octadecylamine | 2 | 0.05 | 0.14 |
| X42 | Glutaric acid | 1 | Dodecylamine | 2 | 0.05 | 0.14 |
| X43 | Glutaric acid | 1 | Decylamine | 2 | 0.05 | 0.14 |
| X44 | Glutaric acid | 1 | Monooctylamine | 2 | 0.07 | 0.20 |
| X45 | Glutaric acid | 1 | Monohexylamine | 2 | 0.09 | 0.26 |
| X46 | Glutaric acid | 1 | Monodecanoic amine | 2 | 0.05 | 0.14 |
| X47 | Glutaric acid | 1 | Monododecanoic amine | 2 | 0.05 | 0.14 |
| X48 | Glutaric acid | 1 | Mono-2-ethylhexylamine | 2 | 0.07 | 0.20 |

TABLE 1-2

| | Carboxylic acid | | Amine | | | |
|---|---|---|---|---|---|---|
| Additive ID | Name | Molar ratio | Name | Molar ratio | $iH_t$ μA/cm$^2$ | $iH_t/iH_0$ — |
| X49 | Adipic acid | 1 | Octadecylamine | 2 | 0.05 | 0.14 |
| X50 | Adipic acid | 1 | Dodecylamine | 2 | 0.05 | 0.14 |
| X51 | Adipic acid | 1 | Decylamine | 2 | 0.05 | 0.14 |
| X52 | Adipic acid | 1 | Monooctylamine | 2 | 0.07 | 0.20 |
| X53 | Adipic acid | 1 | Monohexylamine | 2 | 0.09 | 0.26 |
| X54 | Adipic acid | 1 | Monodecanoic amine | 2 | 0.05 | 0.14 |
| X55 | Adipic acid | 1 | Monododecanoic amine | 2 | 0.05 | 0.14 |
| X56 | Adipic acid | 1 | Mono-2-ethylhexylamine | 2 | 0.07 | 0.20 |
| X57 | Benzoic acid | 1 | Octadecylamine | 1 | 0.10 | 0.29 |
| X58 | Benzoic acid | 1 | Dodecylamine | 1 | 0.10 | 0.29 |
| X59 | Benzoic acid | 1 | Decylamine | 1 | 0.10 | 0.29 |
| X60 | Benzoic acid | 1 | Monooctylamine | 1 | 0.14 | 0.40 |
| X61 | Benzoic acid | 1 | Monohexylamine | 1 | 0.20 | 0.57 |
| X62 | Benzoic acid | 1 | Monodecanoic amine | 1 | 0.10 | 0.29 |
| X63 | Benzoic acid | 1 | Monododecanoic amine | 1 | 0.10 | 0.29 |
| X64 | Benzoic acid | 1 | Mono-2-ethylhexylamine | 1 | 0.14 | 0.40 |

TABLE 1-2-continued

| | Carboxylic acid | | Amine | | | |
|---|---|---|---|---|---|---|
| Additive ID | Name | Molar ratio | Name | Molar ratio | $iH_t$ μA/cm² | $iH_t/iH_0$ — |
| X65 | m-Aminobenzoic acid | 1 | Octadecylamine | 1 | 0.10 | 0.29 |
| X66 | m-Aminobenzoic acid | 1 | Dodecylamine | 1 | 0.10 | 0.29 |
| X67 | m-Aminobenzoic acid | 1 | Decylamine | 1 | 0.10 | 0.29 |
| X68 | m-Aminobenzoic acid | 1 | Monooctylamine | 1 | 0.14 | 0.40 |
| X69 | m-Aminobenzoic acid | 1 | Monohexylamine | 1 | 0.20 | 0.57 |
| X70 | m-Aminobenzoic acid | 1 | Monodecanoic amine | 1 | 0.10 | 0.29 |
| X71 | m-Aminobenzoic acid | 1 | Monododecanoic amine | 1 | 0.10 | 0.29 |
| X72 | m-Aminobenzoic acid | 1 | Mono-2-ethylhexylamine | 1 | 0.14 | 0.40 |
| X73 | p-Aminobenzoic acid | 1 | Octadecylamine | 1 | 0.10 | 0.29 |
| X74 | p-Aminobenzoic acid | 1 | Dodecylamine | 1 | 0.10 | 0.29 |
| X75 | p-Aminobenzoic acid | 1 | Decylamine | 1 | 0.10 | 0.29 |
| X76 | p-Aminobenzoic acid | 1 | Monooctylamine | 1 | 0.14 | 0.40 |
| X77 | p-Aminobenzoic acid | 1 | Monohexylamine | 1 | 0.20 | 0.57 |
| X78 | p-Aminobenzoic acid | 1 | Monodecanoic amine | 1 | 0.10 | 0.29 |
| X79 | p-Aminobenzoic acid | 1 | Monododecanoic amine | 1 | 0.10 | 0.29 |
| X80 | p-Aminobenzoic acid | 1 | Mono-2-ethylhexylamine | 1 | 0.14 | 0.40 |
| X81 | p-Nitrobenzoic acid | 1 | Octadecylamine | 1 | 0.10 | 0.29 |
| X82 | p-Nitrobenzoic acid | 1 | Dodecylamine | 1 | 0.10 | 0.29 |
| X83 | p-Nitrobenzoic acid | 1 | Decylamine | 1 | 0.10 | 0.29 |
| X84 | p-Nitrobenzoic acid | 1 | Monooctylamine | 1 | 0.14 | 0.40 |
| X85 | p-Nitrobenzoic acid | 1 | Monohexylamine | 1 | 0.20 | 0.57 |
| X86 | p-Nitrobenzoic acid | 1 | Monodecanoic amine | 1 | 0.10 | 0.29 |
| X87 | p-Nitrobenzoic acid | 1 | Monododecanoic amine | 1 | 0.10 | 0.29 |
| X88 | p-Nitrobenzoic acid | 1 | Mono-2-ethylhexylamine | 1 | 0.14 | 0.40 |
| X89 | Salicylic acid | 1 | Octadecylamine | 1 | 0.10 | 0.29 |
| X90 | Salicylic acid | 1 | Dodecylamine | 1 | 0.10 | 0.29 |
| X91 | Salicylic acid | 1 | Decylamine | 1 | 0.10 | 0.29 |
| X92 | Salicylic acid | 1 | Monooctylamine | 1 | 0.14 | 0.40 |
| X93 | Salicylic acid | 1 | Monohexylamine | 1 | 0.20 | 0.57 |
| X94 | Salicylic acid | 1 | Monodecanoic amine | 1 | 0.10 | 0.29 |
| X95 | Salicylic acid | 1 | Monododecanoic amine | 1 | 0.10 | 0.29 |
| X96 | Salicylic acid | 1 | Mono-2-ethylhexylamine | 1 | 0.14 | 0.40 |

TABLE 1-3

| | Carboxylic acid | | Amine | | | |
|---|---|---|---|---|---|---|
| Additive ID | Name | Molar ratio | Name | Molar ratio | $iH_t$ μA/cm² | $iH_t/iH_0$ — |
| X97 | p-Hydroxybenzoic acid | 1 | Octadecylamine | 1 | 0.10 | 0.29 |
| X98 | p-Hydroxybenzoic acid | 1 | Dodecylamine | 1 | 0.10 | 0.29 |
| X99 | p-Hydroxybenzoic acid | 1 | Decylamine | 1 | 0.10 | 0.29 |
| X100 | p-Hydroxybenzoic acid | 1 | Monooctylamine | 1 | 0.14 | 0.40 |
| X101 | p-Hydroxybenzoic acid | 1 | Monohexylamine | 1 | 0.20 | 0.57 |
| X102 | p-Hydroxybenzoic acid | 1 | Monodecanoic amine | 1 | 0.10 | 0.29 |
| X103 | p-Hydroxybenzoic acid | 1 | Monododecanoic amine | 1 | 0.10 | 0.29 |
| X104 | p-Hydroxybenzoic acid | 1 | Mono-2-ethylhexylamine | 1 | 0.14 | 0.40 |
| X105 | Toluic acid | 1 | Octadecylamine | 1 | 0.10 | 0.29 |
| X106 | Toluic acid | 1 | Dodecylamine | 1 | 0.10 | 0.29 |
| X107 | Toluic acid | 1 | Decylamine | 1 | 0.10 | 0.29 |
| X108 | Toluic acid | 1 | Monooctylamine | 1 | 0.14 | 0.40 |
| X109 | Toluic acid | 1 | Monohexylamine | 1 | 0.20 | 0.57 |
| X110 | Toluic acid | 1 | Monodecanoic amine | 1 | 0.10 | 0.29 |
| X111 | Toluic acid | 1 | Monododecanoic amine | 1 | 0.10 | 0.29 |
| X112 | Toluic acid | 1 | Mono-2-ethylhexylamine | 1 | 0.14 | 0.40 |
| X113 | p-t-Butylbenzoic acid | 1 | Octadecylamine | 1 | 0.10 | 0.29 |
| X114 | p-t-Butylbenzoic acid | 1 | Dodecylamine | 1 | 0.10 | 0.29 |
| X115 | p-t-Butylbenzoic acid | 1 | Decylamine | 1 | 0.10 | 0.29 |
| X116 | p-t-Butylbenzoic acid | 1 | Monooctylamine | 1 | 0.14 | 0.40 |
| X117 | p-t-Butylbenzoic acid | 1 | Monohexylamine | 1 | 0.20 | 0.57 |
| X118 | p-t-Butylbenzoic acid | 1 | Monodecanoic amine | 1 | 0.10 | 0.29 |
| X119 | p-t-Butylbenzoic acid | 1 | Monododecanoic amine | 1 | 0.10 | 0.29 |
| X120 | p-t-Butylbenzoic acid | 1 | Mono-2-ethylhexylamine | 1 | 0.14 | 0.40 |
| X121 | β-Oxynaphthoic acid | 1 | Octadecylamine | 1 | 0.10 | 0.29 |
| X122 | β-Oxynaphthoic acid | 1 | Dodecylamine | 1 | 0.10 | 0.29 |
| X123 | β-Oxynaphthoic acid | 1 | Decylamine | 1 | 0.10 | 0.29 |
| X124 | β-Oxynaphthoic acid | 1 | Monooctylamine | 1 | 0.14 | 0.40 |
| X125 | β-Oxynaphthoic acid | 1 | Monohexylamine | 1 | 0.20 | 0.57 |
| X126 | β-Oxynaphthoic acid | 1 | Monodecanoic amine | 1 | 0.10 | 0.29 |
| X127 | β-Oxynaphthoic acid | 1 | Monododecanoic amine | 1 | 0.10 | 0.29 |
| X128 | β-Oxynaphthoic acid | 1 | Mono-2-ethylhexylamine | 1 | 0.14 | 0.40 |

TABLE 1-3-continued

| | Carboxylic acid | | Amine | | | |
|---|---|---|---|---|---|---|
| Additive ID | Name | Molar ratio | Name | Molar ratio | $iH_t$ μA/cm² | $iH_t/iH_0$ — |
| X129 | Oxalic acid | 1 | Cyclohexylamine | 2 | 0.09 | 0.26 |
| X130 | Maleic acid | 1 | Cyclohexylamine | 2 | 0.09 | 0.26 |
| X131 | Fumaric acid | 1 | Cyclohexylamine | 2 | 0.09 | 0.26 |
| X132 | Malonic acid | 1 | Cyclohexylamine | 2 | 0.09 | 0.26 |
| X133 | Succinic acid | 1 | Cyclohexylamine | 2 | 0.09 | 0.26 |
| X134 | Glutaric acid | 1 | Cyclohexylamine | 2 | 0.09 | 0.26 |
| X135 | Adipic acid | 1 | Cyclohexylamine | 2 | 0.09 | 0.26 |
| X136 | Oxalic acid | 1 | Dicyclohexylamine | 2 | 0.05 | 0.14 |
| X137 | Maleic acid | 1 | Dicyclohexylamine | 2 | 0.05 | 0.14 |
| X138 | Fumaric acid | 1 | Dicyclohexylamine | 2 | 0.05 | 0.14 |
| X139 | Malonic acid | 1 | Dicyclohexylamine | 2 | 0.05 | 0.14 |
| X140 | Succinic acid | 1 | Dicyclohexylamine | 2 | 0.05 | 0.14 |
| X141 | Glutaric acid | 1 | Dicyclohexylamine | 2 | 0.05 | 0.14 |
| X142 | Adipic acid | 1 | Dicyclohexylamine | 2 | 0.05 | 0.14 |
| X143 | Oxalic acid | 1 | Tricyclohexylamine | 2 | 0.05 | 0.14 |
| X144 | Maleic acid | 1 | Tricyclohexylamine | 2 | 0.05 | 0.14 |
| X145 | Fumaric acid | 1 | Tricyclohexylamine | 2 | 0.05 | 0.14 |
| X146 | Malonic acid | 1 | Tricyclohexylamine | 2 | 0.05 | 0.14 |
| X147 | Succinic acid | 1 | Tricyclohexylamine | 2 | 0.05 | 0.14 |
| X148 | Glutaric acid | 1 | Tricyclohexylamine | 2 | 0.05 | 0.14 |
| X149 | Adipic acid | 1 | Tricyclohexylamine | 2 | 0.05 | 0.14 |

TABLE 2-1

| | Coating | | | | | Properties | | | |
|---|---|---|---|---|---|---|---|---|---|
| | Additive | | | Coating | Coating | Post-coating | Delayed fracture resistance (low temperature) | | |
| No. | Additive ID | Content (mass %) | Organic resin | thickness (μm) | forming method | corrosion resistance | Number of cycles until cracking | Evaluation | Remarks |
| 1 | — | — | — | — | — | Δ | 2 | X | Comparative Example |
| 2 | — | — | A1 | 1.0 | Bar coating | ⊚ | 10 | Δ | Comparative Example |
| 3 | X1 | 5 | A1 | 1.0 | Bar coating | ⊚ | 12 | Δ | Comparative Example |
| 4 | X1 | 10 | A1 | 1.0 | Bar coating | ⊚ | 29 | ⊚ | Example |
| 5 | X1 | 20 | A1 | 1.0 | Bar coating | ⊚ | 29 | ⊚ | Example |
| 6 | X1 | 30 | A1 | 1.0 | Bar coating | ⊚ | 29 | ⊚ | Example |
| 7 | X1 | 50 | A1 | 1.0 | Bar coating | ⊚ | 29 | ⊚ | Example |
| 8 | X1 | 20 | A1 | 0.2 | Bar coating | ○ | 29 | ⊚ | Example |
| 9 | X1 | 20 | A1 | 0.3 | Bar coating | ○ | 29 | ⊚ | Example |
| 10 | X1 | 20 | A1 | 2.0 | Bar coating | ⊚ | 29 | ⊚ | Example |
| 11 | X1 | 20 | A1 | 4.0 | Bar coating | ⊚ | 29 | ⊚ | Example |
| 12 | X2 | 20 | A1 | 1.0 | Bar coating | ⊚ | 29 | ⊚ | Example |
| 13 | X3 | 20 | A1 | 1.0 | Bar coating | ⊚ | 29 | ⊚ | Example |
| 14 | X4 | 20 | A1 | 1.0 | Bar coating | ⊚ | 29 | ⊚ | Example |
| 15 | X5 | 20 | A1 | 1.0 | Bar coating | ⊚ | 29 | ⊚ | Example |
| 16 | X6 | 20 | A1 | 1.0 | Bar coating | ⊚ | 29 | ⊚ | Example |
| 17 | X7 | 20 | A1 | 1.0 | Bar coating | ⊚ | 29 | ⊚ | Example |
| 18 | X8 | 20 | A1 | 1.0 | Bar coating | ⊚ | 29 | ⊚ | Example |
| 19 | X9 | 20 | A1 | 1.0 | Bar coating | ⊚ | 29 | ⊚ | Example |
| 20 | X10 | 20 | A1 | 1.0 | Bar coating | ⊚ | 29 | ⊚ | Example |
| 21 | X11 | 20 | A1 | 1.0 | Bar coating | ⊚ | 29 | ⊚ | Example |
| 22 | X12 | 20 | A1 | 1.0 | Bar coating | ⊚ | 29 | ⊚ | Example |
| 23 | X13 | 20 | A1 | 1.0 | Bar coating | ⊚ | 29 | ⊚ | Example |
| 24 | X14 | 20 | A1 | 1.0 | Bar coating | ⊚ | 29 | ⊚ | Example |
| 25 | X15 | 20 | A1 | 1.0 | Bar coating | ⊚ | 29 | ⊚ | Example |
| 26 | X16 | 20 | A1 | 1.0 | Bar coating | ⊚ | 29 | ⊚ | Example |
| 27 | X17 | 20 | A1 | 1.0 | Bar coating | ⊚ | 29 | ⊚ | Example |
| 28 | X18 | 20 | A1 | 1.0 | Bar coating | ⊚ | 29 | ⊚ | Example |
| 29 | X19 | 20 | A1 | 1.0 | Bar coating | ⊚ | 29 | ⊚ | Example |
| 30 | X20 | 20 | A1 | 1.0 | Bar coating | ⊚ | 29 | ⊚ | Example |
| 31 | X21 | 20 | A1 | 1.0 | Bar coating | ⊚ | 29 | ⊚ | Example |
| 32 | X22 | 20 | A1 | 1.0 | Bar coating | ⊚ | 29 | ⊚ | Example |
| 33 | X23 | 20 | A1 | 1.0 | Bar coating | ⊚ | 29 | ⊚ | Example |
| 34 | X24 | 20 | A1 | 1.0 | Bar coating | ⊚ | 29 | ⊚ | Example |
| 35 | X25 | 20 | A1 | 1.0 | Bar coating | ⊚ | 29 | ⊚ | Example |
| 36 | X26 | 20 | A1 | 1.0 | Bar coating | ⊚ | 29 | ⊚ | Example |
| 37 | X27 | 20 | A1 | 1.0 | Bar coating | ⊚ | 29 | ⊚ | Example |
| 38 | X28 | 20 | A1 | 1.0 | Bar coating | ⊚ | 29 | ⊚ | Example |
| 39 | X29 | 20 | A1 | 1.0 | Bar coating | ⊚ | 29 | ⊚ | Example |
| 40 | X30 | 20 | A1 | 1.0 | Bar coating | ⊚ | 29 | ⊚ | Example |

TABLE 2-1-continued

| | Coating | | | | | Properties | | | |
|---|---|---|---|---|---|---|---|---|---|
| | Additive | | | Coating | Coating | Post-coating | Delayed fracture resistance (low temperature) | | |
| No. | Additive ID | Content (mass %) | Organic resin | thickness (μm) | forming method | corrosion resistance | Number of cycles until cracking | Evaluation | Remarks |
| 41 | X31 | 20 | A1 | 1.0 | Bar coating | ◎ | 29 | ◎ | Example |
| 42 | X32 | 20 | A1 | 1.0 | Bar coating | ◎ | 29 | ◎ | Example |
| 43 | X33 | 20 | A1 | 1.0 | Bar coating | ◎ | 29 | ◎ | Example |
| 44 | X34 | 20 | A1 | 1.0 | Bar coating | ◎ | 29 | ◎ | Example |
| 45 | X35 | 20 | A1 | 1.0 | Bar coating | ◎ | 29 | ◎ | Example |
| 46 | X36 | 20 | A1 | 1.0 | Bar coating | ◎ | 29 | ◎ | Example |
| 47 | X37 | 20 | A1 | 1.0 | Bar coating | ◎ | 29 | ◎ | Example |
| 48 | X38 | 20 | A1 | 1.0 | Bar coating | ◎ | 29 | ◎ | Example |
| 49 | X39 | 20 | A1 | 1.0 | Bar coating | ◎ | 29 | ◎ | Example |
| 50 | X40 | 20 | A1 | 1.0 | Bar coating | ◎ | 29 | ◎ | Example |
| 51 | X41 | 20 | A1 | 1.0 | Bar coating | ◎ | 29 | ◎ | Example |
| 52 | X42 | 20 | A1 | 1.0 | Bar coating | ◎ | 29 | ◎ | Example |
| 53 | X43 | 20 | A1 | 1.0 | Bar coating | ◎ | 29 | ◎ | Example |
| 54 | X44 | 20 | A1 | 1.0 | Bar coating | ◎ | 29 | ◎ | Example |
| 55 | X45 | 20 | A1 | 1.0 | Bar coating | ◎ | 29 | ◎ | Example |
| 56 | X46 | 20 | A1 | 1.0 | Bar coating | ◎ | 29 | ◎ | Example |
| 57 | X47 | 20 | A1 | 1.0 | Bar coating | ◎ | 29 | ◎ | Example |
| 58 | X48 | 20 | A1 | 1.0 | Bar coating | ◎ | 29 | ◎ | Example |

Underline indicates it is outside the appropriate range of the present disclosure.

TABLE 2-2

| | Coating | | | | | Properties | | | |
|---|---|---|---|---|---|---|---|---|---|
| | Additive | | | Coating | Coating | Post-coating | Delayed fracture resistance (low temperature) | | |
| No. | Additive ID | Content (mass %) | Organic resin | thickness (μm) | forming method | corrosion resistance | Number of cycles until cracking | Evaluation | Remarks |
| 59 | X49 | 20 | A1 | 1.0 | Bar coating | ◎ | 29 | ◎ | Example |
| 60 | X50 | 20 | A1 | 1.0 | Bar coating | ◎ | 29 | ◎ | Example |
| 61 | X51 | 20 | A1 | 1.0 | Bar coating | ◎ | 29 | ◎ | Example |
| 62 | X52 | 20 | A1 | 1.0 | Bar coating | ◎ | 29 | ◎ | Example |
| 63 | X53 | 20 | A1 | 1.0 | Bar coating | ◎ | 29 | ◎ | Example |
| 64 | X54 | 20 | A1 | 1.0 | Bar coating | ◎ | 29 | ◎ | Example |
| 65 | X55 | 20 | A1 | 1.0 | Bar coating | ◎ | 29 | ◎ | Example |
| 66 | X56 | 20 | A1 | 1.0 | Bar coating | ◎ | 29 | ◎ | Example |
| 67 | X57 | 20 | A1 | 1.0 | Bar coating | ◎ | 29 | ◎ | Example |
| 68 | X58 | 20 | A1 | 1.0 | Bar coating | ◎ | 29 | ◎ | Example |
| 69 | X59 | 20 | A1 | 1.0 | Bar coating | ◎ | 29 | ◎ | Example |
| 70 | X60 | 20 | A1 | 1.0 | Bar coating | ◎ | 29 | ◎ | Example |
| 71 | X61 | 20 | A1 | 1.0 | Bar coating | ◎ | 27 | ○ | Example |
| 72 | X62 | 20 | A1 | 1.0 | Bar coating | ◎ | 29 | ◎ | Example |
| 73 | X63 | 20 | A1 | 1.0 | Bar coating | ◎ | 29 | ◎ | Example |
| 74 | X64 | 20 | A1 | 1.0 | Bar coating | ◎ | 29 | ◎ | Example |
| 75 | X65 | 20 | A1 | 1.0 | Bar coating | ◎ | 29 | ◎ | Example |
| 76 | X66 | 20 | A1 | 1.0 | Bar coating | ◎ | 29 | ◎ | Example |
| 77 | X67 | 20 | A1 | 1.0 | Bar coating | ◎ | 29 | ◎ | Example |
| 78 | X68 | 20 | A1 | 1.0 | Bar coating | ◎ | 29 | ◎ | Example |
| 79 | X69 | 20 | A1 | 1.0 | Bar coating | ◎ | 27 | ○ | Example |
| 80 | X70 | 20 | A1 | 1.0 | Bar coating | ◎ | 29 | ◎ | Example |
| 81 | X71 | 20 | A1 | 1.0 | Bar coating | ◎ | 29 | ◎ | Example |
| 82 | X72 | 20 | A1 | 1.0 | Bar coating | ◎ | 29 | ◎ | Example |
| 83 | X73 | 20 | A1 | 1.0 | Bar coating | ◎ | 29 | ◎ | Example |
| 84 | X74 | 20 | A1 | 1.0 | Bar coating | ◎ | 29 | ◎ | Example |
| 85 | X75 | 20 | A1 | 1.0 | Bar coating | ◎ | 29 | ◎ | Example |
| 86 | X76 | 20 | A1 | 1.0 | Bar coating | ◎ | 29 | ◎ | Example |
| 87 | X77 | 20 | A1 | 1.0 | Bar coating | ◎ | 27 | ○ | Example |
| 88 | X78 | 20 | A1 | 1.0 | Bar coating | ◎ | 29 | ◎ | Example |
| 89 | X79 | 20 | A1 | 1.0 | Bar coating | ◎ | 29 | ◎ | Example |
| 90 | X80 | 20 | A1 | 1.0 | Bar coating | ◎ | 29 | ◎ | Example |
| 91 | X81 | 20 | A1 | 1.0 | Bar coating | ◎ | 29 | ◎ | Example |
| 92 | X82 | 20 | A1 | 1.0 | Bar coating | ◎ | 29 | ◎ | Example |
| 93 | X83 | 20 | A1 | 1.0 | Bar coating | ◎ | 29 | ◎ | Example |
| 94 | X84 | 20 | A1 | 1.0 | Bar coating | ◎ | 29 | ◎ | Example |
| 95 | X85 | 20 | A1 | 1.0 | Bar coating | ◎ | 27 | ○ | Example |
| 96 | X86 | 20 | A1 | 1.0 | Bar coating | ◎ | 29 | ◎ | Example |
| 97 | X87 | 20 | A1 | 1.0 | Bar coating | ◎ | 29 | ◎ | Example |

TABLE 2-2-continued

| | Coating | | | | | Properties | | | |
|---|---|---|---|---|---|---|---|---|---|
| | Additive | | | Coating | Coating | Post-coating | Delayed fracture resistance (low temperature) | | |
| No. | Additive ID | Content (mass %) | Organic resin | thickness (µm) | forming method | corrosion resistance | Number of cycles until cracking | Evaluation | Remarks |
| 98 | X88 | 20 | A1 | 1.0 | Bar coating | ⊚ | 29 | ⊚ | Example |
| 99 | X89 | 20 | A1 | 1.0 | Bar coating | ⊚ | 29 | ⊚ | Example |
| 100 | X90 | 20 | A1 | 1.0 | Bar coating | ⊚ | 29 | ⊚ | Example |
| 101 | X91 | 20 | A1 | 1.0 | Bar coating | ⊚ | 29 | ⊚ | Example |
| 102 | X92 | 20 | A1 | 1.0 | Bar coating | ⊚ | 29 | ⊚ | Example |
| 103 | X93 | 20 | A1 | 1.0 | Bar coating | ⊚ | 27 | ○ | Example |
| 104 | X94 | 20 | A1 | 1.0 | Bar coating | ⊚ | 29 | ⊚ | Example |
| 105 | X95 | 20 | A1 | 1.0 | Bar coating | ⊚ | 29 | ⊚ | Example |
| 106 | X96 | 20 | A1 | 1.0 | Bar coating | ⊚ | 29 | ⊚ | Example |

TABLE 2-3

| | Coating | | | | | Properties | | | |
|---|---|---|---|---|---|---|---|---|---|
| | Additive | | | Coating | Coating | Post-coating | Delayed fracture resistance (low temperature) | | |
| No. | Additive ID | Content (mass %) | Organic resin | thickness (µm) | forming method | corrosion resistance | Number of cycles until cracking | Evaluation | Remarks |
| 107 | X97 | 20 | A1 | 1.0 | Bar coating | ⊚ | 29 | ⊚ | Example |
| 108 | X98 | 20 | A1 | 1.0 | Bar coating | ⊚ | 29 | ⊚ | Example |
| 109 | X99 | 20 | A1 | 1.0 | Bar coating | ⊚ | 29 | ⊚ | Example |
| 110 | X100 | 20 | A1 | 1.0 | Bar coating | ⊚ | 29 | ⊚ | Example |
| 111 | X101 | 20 | A1 | 1.0 | Bar coating | ⊚ | 27 | ○ | Example |
| 112 | X102 | 20 | A1 | 1.0 | Bar coating | ⊚ | 29 | ⊚ | Example |
| 113 | X103 | 20 | A1 | 1.0 | Bar coating | ⊚ | 29 | ⊚ | Example |
| 114 | X104 | 20 | A1 | 1.0 | Bar coating | ⊚ | 29 | ⊚ | Example |
| 115 | X105 | 20 | A1 | 1.0 | Bar coating | ⊚ | 29 | ⊚ | Example |
| 116 | X106 | 20 | A1 | 1.0 | Bar coating | ⊚ | 29 | ⊚ | Example |
| 117 | X107 | 20 | A1 | 1.0 | Bar coating | ⊚ | 29 | ⊚ | Example |
| 118 | X108 | 20 | A1 | 1.0 | Bar coating | ⊚ | 29 | ⊚ | Example |
| 119 | X109 | 20 | A1 | 1.0 | Bar coating | ⊚ | 27 | ○ | Example |
| 120 | X110 | 20 | A1 | 1.0 | Bar coating | ⊚ | 29 | ⊚ | Example |
| 121 | X111 | 20 | A1 | 1.0 | Bar coating | ⊚ | 29 | ⊚ | Example |
| 122 | X112 | 20 | A1 | 1.0 | Bar coating | ⊚ | 29 | ⊚ | Example |
| 123 | X113 | 20 | A1 | 1.0 | Bar coating | ⊚ | 29 | ⊚ | Example |
| 124 | X114 | 20 | A1 | 1.0 | Bar coating | ⊚ | 29 | ⊚ | Example |
| 125 | X115 | 20 | A1 | 1.0 | Bar coating | ⊚ | 29 | ⊚ | Example |
| 126 | X116 | 20 | A1 | 1.0 | Bar coating | ⊚ | 29 | ⊚ | Example |
| 127 | X117 | 20 | A1 | 1.0 | Bar coating | ⊚ | 27 | ○ | Example |
| 128 | X118 | 20 | A1 | 1.0 | Bar coating | ⊚ | 29 | ⊚ | Example |
| 129 | X119 | 20 | A1 | 1.0 | Bar coating | ⊚ | 29 | ⊚ | Example |
| 130 | X120 | 20 | A1 | 1.0 | Bar coating | ⊚ | 29 | ⊚ | Example |
| 131 | X121 | 20 | A1 | 1.0 | Bar coating | ⊚ | 29 | ⊚ | Example |
| 132 | X122 | 20 | A1 | 1.0 | Bar coating | ⊚ | 29 | ⊚ | Example |
| 133 | X123 | 20 | A1 | 1.0 | Bar coating | ⊚ | 29 | ⊚ | Example |
| 134 | X124 | 20 | A1 | 1.0 | Bar coating | ⊚ | 29 | ⊚ | Example |
| 135 | X125 | 20 | A1 | 1.0 | Bar coating | ⊚ | 27 | ○ | Example |
| 136 | X126 | 20 | A1 | 1.0 | Bar coating | ⊚ | 29 | ⊚ | Example |
| 137 | X127 | 20 | A1 | 1.0 | Bar coating | ⊚ | 29 | ⊚ | Example |
| 138 | X128 | 20 | A1 | 1.0 | Bar coating | ⊚ | 29 | ⊚ | Example |
| 139 | X129 | 20 | A1 | 1.0 | Bar coating | ⊚ | 29 | ⊚ | Example |
| 140 | X130 | 20 | A1 | 1.0 | Bar coating | ⊚ | 29 | ⊚ | Example |
| 141 | X131 | 20 | A1 | 1.0 | Bar coating | ⊚ | 29 | ⊚ | Example |
| 142 | X132 | 20 | A1 | 1.0 | Bar coating | ⊚ | 29 | ⊚ | Example |
| 143 | X133 | 20 | A1 | 1.0 | Bar coating | ⊚ | 29 | ⊚ | Example |
| 144 | X134 | 20 | A1 | 1.0 | Bar coating | ⊚ | 29 | ⊚ | Example |
| 145 | X135 | 20 | A1 | 1.0 | Bar coating | ⊚ | 29 | ⊚ | Example |
| 146 | X136 | 20 | A1 | 1.0 | Bar coating | ⊚ | 29 | ⊚ | Example |
| 147 | X137 | 20 | A1 | 1.0 | Bar coating | ⊚ | 29 | ⊚ | Example |
| 148 | X138 | 20 | A1 | 1.0 | Bar coating | ⊚ | 29 | ⊚ | Example |
| 149 | X139 | 20 | A1 | 1.0 | Bar coating | ⊚ | 29 | ⊚ | Example |
| 150 | X140 | 20 | A1 | 1.0 | Bar coating | ⊚ | 29 | ⊚ | Example |
| 151 | X141 | 20 | A1 | 1.0 | Bar coating | ⊚ | 29 | ⊚ | Example |
| 152 | X142 | 20 | A1 | 1.0 | Bar coating | ⊚ | 29 | ⊚ | Example |
| 153 | X143 | 20 | A1 | 1.0 | Bar coating | ⊚ | 29 | ⊚ | Example |
| 154 | X144 | 20 | A1 | 1.0 | Bar coating | ⊚ | 29 | ⊚ | Example |
| 155 | X145 | 20 | A1 | 1.0 | Bar coating | ⊚ | 29 | ⊚ | Example |

TABLE 2-3-continued

| | Coating | | | | | Properties | | | |
|---|---|---|---|---|---|---|---|---|---|
| | Additive | | | Coating | Coating | Post-coating | Delayed fracture resistance (low temperature) | | |
| No. | Additive ID | Content (mass %) | Organic resin | thickness (μm) | forming method | corrosion resistance | Number of cycles until cracking | Evaluation | Remarks |
| 156 | X146 | 20 | A1 | 1.0 | Bar coating | ◎ | 29 | ◎ | Example |
| 157 | X147 | 20 | A1 | 1.0 | Bar coating | ◎ | 29 | ◎ | Example |
| 158 | X148 | 20 | A1 | 1.0 | Bar coating | ◎ | 29 | ◎ | Example |
| 159 | X149 | 20 | A1 | 1.0 | Bar coating | ◎ | 29 | ◎ | Example |
| 160 | X1 | 20 | A1 | 1.0 | Spraying | ◎ | 29 | ◎ | Example |
| 161 | X1 | 20 | A1 | 1.0 | Immersing + roller | ◎ | 29 | ◎ | Example |
| 162 | X1 | 20 | A2 | 1.0 | Bar coating | ◎ | 29 | ◎ | Example |
| 163 | X1 | 20 | A2 | 2.0 | Bar coating | ◎ | 29 | ◎ | Example |
| 164 | X1 | 20 | A3 | 1.0 | Bar coating | ◎ | 29 | ◎ | Example |
| 165 | X1 | 20 | A4 | 1.0 | Bar coating | ◎ | 29 | ◎ | Example |

Example 2

A galvannealed steel sheet was prepared as a sample steel sheet in the same manner as in Example 1.

Preparation of surface-treated galvanized steel sheet

<Formation of Lower Coating>

Additive crystals obtained with the method described in Example 1 were filtered, dried, and then mixed with a surface-treatment solution B having the following composition in the mass ratio listed in Table 3 to obtain a surface-treatment solution containing the additive. In the component (d), the mixing ratio (mass %) of 1-hydroxymethane-1,1-diphosphonic acid to tartaric acid is 9:1. The surface-treatment solution was applied to the surface of the sample steel sheet by bar coating, and then heated by an induction heater so that the sheet temperature reached 140° C. to form a lower coating on the sample steel sheet. This lower coating is a coating (pre-treatment layer) that serves as the base of the upper coating described below.

Surface-Treatment Solution B:

Component (a): Sodium zirconium carbonate 20 mass %

Component (b): Tetraethoxysilane 1.68 mass %

Component (c): Polyethylene glycol diglycidyl ether 0.43 mass %

Component (d): 1-hydroxymethane-1,1-diphosphonic acid (9)+tartaric acid (1) 1.22 mass %

Component (e): Sodium metavanadate 0.34 mass %

Component (f): Ammonium titanium fluoride 0.07 mass %

<Formation of Upper Coating>

Additive crystals obtained with the method described in Example 1 were filtered, dried, and then mixed with an organic resin in the mass ratio listed in Table 3 to obtain a surface-treatment solution. The following A1 or A4 was used as the organic resin, and a surface-treatment solution containing any of the organic resins and the prescribed additive (in some comparative examples, a surface-treatment solution containing only the organic resin) was applied to the surface of the sample steel sheet after the formation of lower coating by bar coating. Next, the sample steel sheet was heated by an induction heater so that the sheet temperature reached 140° C. to form an upper coating on the sample steel sheet where a lower coating had been formed, and a surface-treated galvanized steel sheet with a two-layer coating was obtained.

A1: Epoxy resin (manufactured by Japan Epoxy Resin Co., Ltd., product name: jER1009)

A5: Epoxy ester resin (manufactured by DIC Corporation, product name: WATERSOL EFD-5560)

Each galvanized steel sheet obtained as described above was evaluated in terms of delayed fracture resistance and post-coating corrosion resistance in the same manner as in Example 1. The evaluation results are listed in Table 3, along with the composition of the coating. The coating thickness was also measured in the same manner as in Example 1. The results are listed in Table 3.

In Table 3, No. 1 (Comparative Example) is a coated or plated steel sheet without coating (a comparative example that is a galvannealed steel sheet as it is). It is understood that cracking occurs early in No. 1, indicating poor delayed fracture resistance.

The steel sheets of No. 2 to No. 35 are examples of surface-treated galvanized steel sheets where a lower coating and an upper coating are formed on a hot-dip galvanized steel sheet. The steel sheets of No. 5 to 35, where the additive content is in the range of the present disclosure, all have excellent delayed fracture resistance and good post-coating corrosion resistance.

On the other hand, the steel sheet of No. 2, where no additive is added, and the steel sheets of No. 3 and No. 4, where the additive content is less than the range of the present disclosure, have slightly improved delayed fracture resistance compared to the steel sheet of No. 1 without coating, but they have poor delayed fracture resistance compared to the steel sheets of Nos. 5 to 35 that are Examples.

TABLE 3

| No. | Lower coating: Additive ID | Lower coating: Content (mass %) | Lower coating: Surface-treatment solution | Coating thickness (µm) | Upper coating: Additive ID | Upper coating: Content (mass %) | Upper coating: Organic resin | Coating thickness (µm) | Total Additive content (mass %) | Properties: Post-coating corrosion resistance | Delayed fracture resistance (low temperature): Number of cycles until cracking | Delayed fracture resistance (low temperature): Evaluation | Remarks |
|---|---|---|---|---|---|---|---|---|---|---|---|---|---|
| 1 | — | — | — | — | — | — | — | — | — | Δ | 2 | X | Comparative Example |
| 2 | — | — | B | 0.5 | — | — | A1 | 1.0 | — | ○ | 10 | Δ | Comparative Example |
| 3 | X17 | 5 | B | 0.5 | — | — | A1 | 1.0 | 1.7 | ◎ | 19 | Δ | Comparative Example |
| 4 | — | — | B | 0.5 | X17 | 5 | A1 | 1.0 | 3.3 | ◎ | 19 | Δ | Comparative Example |
| 5 | X17 | 35 | B | 0.5 | — | — | A1 | 1.0 | 11.7 | ◎ | 29 | ◎ | Example |
| 6 | X17 | 20 | B | 0.5 | X17 | 20 | A1 | 1.0 | 20.0 | ◎ | 29 | ◎ | Example |
| 7 | — | — | B | 0.5 | X17 | 20 | A1 | 1.0 | 13.3 | ◎ | 29 | ◎ | Example |
| 8 | — | — | B | 0.5 | X18 | 20 | A1 | 1.0 | 13.3 | ◎ | 29 | ◎ | Example |
| 9 | — | — | B | 0.5 | X19 | 20 | A1 | 1.0 | 13.3 | ◎ | 29 | ◎ | Example |
| 10 | — | — | B | 0.5 | X20 | 20 | A1 | 1.0 | 13.3 | ◎ | 29 | ◎ | Example |
| 11 | — | — | B | 0.5 | X21 | 20 | A1 | 1.0 | 13.3 | ◎ | 29 | ◎ | Example |
| 12 | — | — | B | 0.5 | X22 | 20 | A1 | 1.0 | 13.3 | ◎ | 29 | ◎ | Example |
| 13 | — | — | B | 0.5 | X23 | 20 | A1 | 1.0 | 13.3 | ◎ | 29 | ◎ | Example |
| 14 | — | — | B | 0.5 | X24 | 20 | A1 | 1.0 | 13.3 | ◎ | 29 | ◎ | Example |
| 15 | — | — | B | 0.5 | X49 | 20 | A1 | 1.0 | 13.3 | ◎ | 29 | ◎ | Example |
| 16 | — | — | B | 0.5 | X50 | 20 | A1 | 1.0 | 13.3 | ◎ | 29 | ◎ | Example |
| 17 | — | — | B | 0.5 | X51 | 20 | A1 | 1.0 | 13.3 | ◎ | 29 | ◎ | Example |
| 18 | — | — | B | 0.5 | X52 | 20 | A1 | 1.0 | 13.3 | ◎ | 29 | ◎ | Example |
| 19 | — | — | B | 0.5 | X53 | 20 | A1 | 1.0 | 13.3 | ◎ | 29 | ◎ | Example |
| 20 | — | — | B | 0.5 | X54 | 20 | A1 | 1.0 | 13.3 | ◎ | 29 | ◎ | Example |
| 21 | — | — | B | 0.5 | X55 | 20 | A1 | 1.0 | 13.3 | ◎ | 29 | ◎ | Example |
| 22 | — | — | B | 0.5 | X56 | 20 | A1 | 1.0 | 13.3 | ◎ | 29 | ◎ | Example |
| 23 | — | — | B | 0.5 | X97 | 20 | A1 | 1.0 | 13.3 | ◎ | 29 | ◎ | Example |
| 24 | — | — | B | 0.5 | X98 | 20 | A1 | 1.0 | 13.3 | ◎ | 29 | ◎ | Example |
| 25 | — | — | B | 0.5 | X99 | 20 | A1 | 1.0 | 13.3 | ◎ | 29 | ◎ | Example |
| 26 | — | — | B | 0.5 | X100 | 20 | A1 | 1.0 | 13.3 | ◎ | 29 | ◎ | Example |
| 27 | — | — | B | 0.5 | X101 | 20 | A1 | 1.0 | 13.3 | ◎ | 28 | ○ | Example |
| 28 | — | — | B | 0.5 | X102 | 20 | A1 | 1.0 | 13.3 | ◎ | 29 | ◎ | Example |
| 29 | — | — | B | 0.5 | X103 | 20 | A1 | 1.0 | 13.3 | ◎ | 29 | ◎ | Example |
| 30 | — | — | B | 0.5 | X104 | 20 | A1 | 1.0 | 13.3 | ◎ | 29 | ◎ | Example |
| 31 | — | — | B | 0.5 | X138 | 20 | A1 | 1.0 | 13.3 | ◎ | 29 | ◎ | Example |
| 32 | — | — | B | 0.5 | X142 | 20 | A1 | 1.0 | 13.3 | ◎ | 29 | ◎ | Example |
| 33 | — | — | B | 0.5 | X17 | 50 | A1 | 1.0 | 33.3 | ◎ | 29 | ◎ | Example |
| 34 | — | — | B | 0.5 | X17 | 20 | A1 | 3.5 | 17.5 | ◎ | 29 | ◎ | Example |
| 35 | — | — | B | 0.5 | X17 | 20 | A5 | 1.0 | 13.3 | ◎ | 29 | ◎ | Example |

Underline indicates it is outside the appropriate range of the present disclosure.

REFERENCE SIGNS LIST

100 hydrogen entry amount measurement device
10 test piece
11 hydrogen entry surface
12 hydrogen detection surface
20 hydrogen generation tank
21 hydrogen detection tank
23 reference electrode
24 counter electrode
30 potentiostat
40 zinc sheet
50 palladium coating or plating
1 test piece
2 bolt
3 nut

The invention claimed is:

1. A surface-treated galvanized steel sheet, comprising a steel sheet having a tensile strength of 1180 MPa or more, a galvanized layer formed on at least one side of the steel sheet, and a coating formed on the galvanized layer, wherein the coating contains an additive in an amount of 10 mass % or more and 50 mass % or less in terms of solid content, and the additive is at least one selected from the group consisting of a salt of an aliphatic dicarboxylic acid having 2 to 8 carbon atoms and an alkylamine having 6 to 18 carbon atoms; a salt of an aliphatic dicarboxylic acid having 2 to 8 carbon atoms and a cycloalkylamine having 6 to 18 carbon atoms; and a salt of an aromatic monocarboxylic acid having 7 to 12 carbon atoms and an alkylamine having 6 to 18 carbon atoms, wherein the coating contains at least one selected from the group consisting of epoxy resin, acrylic resin, urethane resin, ethylene resin, phenol resin, polyester resin, fluororesin, polyolefin resin, and epoxy ester resin.

2. The surface-treated galvanized steel sheet according to claim 1, wherein the aliphatic dicarboxylic acid having 2 to 8 carbon atoms is at least one selected from the group consisting of oxalic acid, maleic acid, fumaric acid, malonic acid, succinic acid, glutaric acid, and adipic acid, the aromatic monocarboxylic acid having 7 to 12 carbon atoms is at least one selected from the group consisting of benzoic acid, m-aminobenzoic acid, p-aminobenzoic acid, p-nitrobenzoic acid, salicylic acid, p-hydroxybenzoic acid, toluic acid, p-t-butylbenzoic acid, and β-oxynaphthoic acid, the alkylamine having 6 to 18 carbon atoms is at least one selected from the group consisting octadecylamine, dodecylamine, decylamine, monooctylamine, monohexylamine, monodecanoic amine, monododecanoic amine, and mono-2-ethylhexylamine, and the cycloalkylamine having 6 to 18 carbon atoms is cyclohexylamine, dicyclohexylamine, or tricyclohexylamine.

3. The surface-treated galvanized steel sheet according to claim 2, wherein a hydrogen permeation current density iHt measured by adding the additive to a solution simulating a corrosion environment at 1 g/L, and a hydrogen permeation current density $iH_0$ measured without adding the additive to the solution satisfy the following Expression (1), $$iH_t/iH_0 \leq 0.50 \quad (1)$$

where the hydrogen permeation current density iH is measured by electrically connecting a zinc sheet and a test steel sheet, exposing the zinc sheet and one side of the test steel sheet to the solution, taking the one side as a hydrogen entry surface, taking the other side of the test steel sheet as a hydrogen detection surface comprising a palladium coating or plating, and measuring the hydrogen permeation current density using an electrochemical cell provided on the hydrogen detection surface.

4. The surface-treated galvanized steel sheet according to claim 3, comprising a pre-treatment layer between the galvanized layer and the coating.

5. The surface-treated galvanized steel sheet according to claim 2, comprising a pre-treatment layer between the galvanized layer and the coating.

6. The surface-treated galvanized steel sheet according to claim 1, wherein a hydrogen permeation current density $iH_t$ measured by adding the additive to a solution simulating a corrosion environment at 1 g/L, and a hydrogen permeation current density iHo measured without adding the additive to the solution satisfy the following Expression (1), $$iH_t/iH_0 \leq 0.50 \quad (1)$$

where the hydrogen permeation current density iH is measured by electrically connecting a zinc sheet and a test steel sheet, exposing the zinc sheet and one side of the test steel sheet to the solution, taking the one side as a hydrogen entry surface, taking the other side of the test steel sheet as a hydrogen detection surface comprising a palladium coating or plating, and measuring the hydrogen permeation current density using an electrochemical cell provided on the hydrogen detection surface.

7. The surface-treated galvanized steel sheet according to claim 6, comprising a pre-treatment layer between the galvanized layer and the coating.

8. The surface-treated galvanized steel sheet according to claim 1, comprising a pre-treatment layer between the galvanized layer and the coating.

* * * * *